US007794320B2

(12) United States Patent
Baerlocher et al.

(10) Patent No.: US 7,794,320 B2
(45) Date of Patent: Sep. 14, 2010

(54) GAMING DEVICE HAVING A PLURALITY OF SYMBOL GENERATORS AND ACCUMULATION GAME WITH MULTIPLE INDEPENDENT TERMINATING CONDITIONS

(75) Inventors: Anthony J. Baerlocher, Reno, NV (US); Ryan W. Cuddy, Reno, NV (US); Joel P. Scarpulla, Reno, NV (US); Brian Krueger, Reno, NV (US)

(73) Assignee: IGT, Reno, NV (US)

( * ) Notice: Subject to any disclaimer, the term of this patent is extended or adjusted under 35 U.S.C. 154(b) by 1380 days.

(21) Appl. No.: 10/941,485

(22) Filed: Sep. 14, 2004

(65) Prior Publication Data

US 2005/0054434 A1 Mar. 10, 2005

Related U.S. Application Data

(63) Continuation-in-part of application No. 09/822,697, filed on Mar. 30, 2001, now Pat. No. 6,796,899.

(51) Int. Cl.
*A63F 13/00* (2006.01)

(52) U.S. Cl. ............................ 463/20; 463/16; 463/22; 463/26; 463/42

(58) Field of Classification Search .................. 463/16, 463/20, 25, 22, 26, 44
See application file for complete search history.

(56) References Cited

U.S. PATENT DOCUMENTS

| | | | |
|---|---|---|---|
| 3,191,937 | A | 6/1965 | Kropinski |
| 3,386,739 | A | 6/1968 | Lino |
| 3,506,267 | A | 4/1970 | Taillie |
| 4,448,419 | A | 5/1984 | Telnaes |
| 4,560,161 | A | 12/1985 | Hamano |
| 4,618,150 | A | 10/1986 | Kimura |
| 4,695,053 | A | 9/1987 | Vazquez, Jr. et al. |
| 4,775,155 | A | 10/1988 | Lees |
| 5,205,555 | A | 4/1993 | Hamano |

(Continued)

FOREIGN PATENT DOCUMENTS

EP 0 874 337 A1 10/1998

(Continued)

OTHER PUBLICATIONS

Addams Family Advertisement and Article written by IGT, Strictly Slots, published in 2000.

(Continued)

*Primary Examiner*—James S. McClellan
*Assistant Examiner*—Sunit Pandya
(74) *Attorney, Agent, or Firm*—K&L Gates LLP

(57) ABSTRACT

A gaming device includes a plurality of symbol generators displayed to a player. A plurality of symbol sets are associated with each symbol generator and each symbol set includes a plurality of symbols. Each of the symbols has a value and a probability. The processor generates one of the symbols on each of the symbol generators and marks each generated symbol. The gaming device continues generating symbols until all of the symbols in a symbol set associated with at least one of the symbol generators are marked. The game provides an award to a player when all of the symbols in at least one of the symbol sets are marked.

62 Claims, 27 Drawing Sheets

U.S. PATENT DOCUMENTS 5,342,047 A 8/1994 Heidel et al.
5,344,145 A 9/1994 Chadwick et al.
5,393,057 A 2/1995 Marnell, II
5,393,061 A 2/1995 Manship et al.
5,411,271 A 5/1995 Mirando
5,449,173 A 9/1995 Thomas et al.
5,456,465 A 10/1995 Durham
5,536,016 A 7/1996 Thompson
5,577,727 A 11/1996 Brame et al.
5,611,535 A 3/1997 Tiberio
5,611,730 A 3/1997 Weiss
5,639,089 A 6/1997 Matsumoto et al.
5,641,730 A 6/1997 Brown
5,645,486 A 7/1997 Nagao et al.
5,722,891 A 3/1998 Inoue
5,752,881 A 5/1998 Inoue
5,755,619 A 5/1998 Matsumoto et al.
5,769,716 A 6/1998 Saffari et al.
5,772,509 A 6/1998 Weiss
5,788,573 A 8/1998 Baerlocher et al.
5,823,874 A 10/1998 Adams
5,833,537 A * 11/1998 Barrie ......................... 463/21
5,848,932 A 12/1998 Adams
5,851,148 A 12/1998 Brune et al.
5,882,261 A 3/1999 Adams
5,890,962 A 4/1999 Takemoto
5,902,184 A 5/1999 Bennett
5,911,418 A 6/1999 Adams
5,927,714 A 7/1999 Kaplan
5,934,998 A 8/1999 Forte et al.
5,935,002 A 8/1999 Falciglia
5,938,200 A 8/1999 Markowicz et al.
5,947,820 A 9/1999 Morro et al.
5,951,397 A 9/1999 Dickinson
5,976,015 A 11/1999 Seelig et al.
5,980,384 A 11/1999 Barrie
5,997,400 A 12/1999 Seelig et al.
5,997,401 A 12/1999 Crawford
6,004,207 A 12/1999 Wilson, Jr. et al.
6,015,346 A 1/2000 Bennett
6,019,369 A 2/2000 Nakagawa et al.
6,033,307 A 3/2000 Vancura
6,056,642 A 5/2000 Bennett
6,059,289 A 5/2000 Vancura
6,059,658 A 5/2000 Mngano et al.
6,062,980 A 5/2000 Luciano
6,089,976 A 7/2000 Schneider et al.
6,089,978 A 7/2000 Adams
6,093,102 A 7/2000 Bennett
6,095,921 A 8/2000 Walker et al.
6,102,798 A 8/2000 Bennett
6,117,009 A 9/2000 Yoseloff
6,120,377 A * 9/2000 McGinnis et al. ............. 463/20
6,126,542 A 10/2000 Fier
6,135,884 A 10/2000 Hedrick et al.
6,142,873 A 11/2000 Weiss et al.
6,159,097 A 12/2000 Gura
6,159,098 A 12/2000 Slomiany et al.
6,162,121 A 12/2000 Morro et al.
6,165,071 A 12/2000 Weiss
6,168,520 B1 1/2001 Baerlocher et al.
6,168,523 B1 1/2001 Piechowiak et al.
6,173,955 B1 1/2001 Perrie et al.
6,174,235 B1 1/2001 Walker et al.
6,186,894 B1 2/2001 Mayeroff
6,190,254 B1 2/2001 Bennett
6,190,255 B1 2/2001 Thomas et al.
6,203,429 B1 3/2001 Demar et al.
6,224,482 B1 5/2001 Bennett
6,224,483 B1 5/2001 Mayeroff
6,227,971 B1 5/2001 Weiss
6,231,442 B1 5/2001 Mayeroff
6,234,897 B1 5/2001 Frohm et al.
6,261,177 B1 7/2001 Bennett
6,270,408 B1 8/2001 Sakamoto et al.
6,270,411 B1 8/2001 Gura et al.
6,270,412 B1 8/2001 Crawford et al.
6,299,165 B1 10/2001 Nagano
6,309,300 B1 10/2001 Glavich
6,312,332 B1 11/2001 Walker et al.
6,315,660 B1 11/2001 DeMar et al.
6,315,663 B1 11/2001 Sakamoto
6,315,664 B1 11/2001 Baerlocher et al.
6,319,123 B1 11/2001 Paludi
6,319,124 B1 11/2001 Baerlocher et al.
6,322,309 B1 11/2001 Thomas et al.
6,334,814 B1 1/2002 Adams
6,336,863 B1 1/2002 Baerlocher et al.
6,346,043 B1 * 2/2002 Colin et al. ................... 463/17
6,347,996 B1 2/2002 Gilmore et al.
6,364,766 B1 4/2002 Anderson et al.
6,364,767 B1 4/2002 Brossard et al.
6,364,768 B1 4/2002 Acres et al.
6,398,644 B1 6/2002 Perrie et al.
6,428,412 B1 * 8/2002 Anderson et al. .............. 463/9
6,435,511 B1 8/2002 Vancura et al.
6,439,995 B1 8/2002 Hughs-Baird et al.
6,443,837 B1 9/2002 Jaffe et al.
6,450,887 B1 9/2002 Mir et al.
6,461,241 B1 * 10/2002 Webb et al. ................... 463/20
6,464,582 B1 10/2002 Baerlocher et al.
6,508,707 B2 1/2003 DeMar et al.
6,511,375 B1 1/2003 Kaminkow
6,547,242 B1 4/2003 Sugiyama et al.
6,554,283 B2 4/2003 Vancura et al.
6,561,904 B2 5/2003 Locke et al.
6,582,307 B2 6/2003 Webb
6,585,591 B1 7/2003 Baerlocher et al.
6,599,185 B1 7/2003 Kaminkow et al.
6,599,193 B2 * 7/2003 Baerlocher et al. ............ 463/27
6,602,135 B1 8/2003 Gerrard
6,602,137 B2 8/2003 Kaminkow et al.
6,607,437 B2 8/2003 Casey et al.
6,607,438 B2 8/2003 Baerlocher et al.
6,609,971 B2 8/2003 Vancura
6,609,972 B2 * 8/2003 Seelig et al. .................. 463/16
6,609,973 B1 * 8/2003 Weiss .......................... 463/20
6,632,140 B2 10/2003 Berman et al.
6,645,071 B2 11/2003 Perrie et al.
6,685,561 B2 2/2004 Anderson et al.
6,719,630 B1 4/2004 Seelig et al.
6,796,899 B2 9/2004 Baerlocher
6,796,900 B2 * 9/2004 Baerlocher et al. ............ 463/16
6,802,775 B2 10/2004 Baerlocher et al.
6,855,052 B2 2/2005 Weiss et al.
6,857,958 B2 2/2005 Osawa
6,899,618 B2 5/2005 Colin et al.
6,913,533 B2 7/2005 Cuddy et al.
6,932,701 B2 8/2005 Glavich et al.
7,169,046 B2 1/2007 Webb et al.
7,270,604 B2 * 9/2007 Gerrard et al. ................ 463/16
7,575,514 B2 8/2009 Cuddy et al.
2001/0024971 A1 9/2001 Brossard
2001/0031659 A1 10/2001 Perrie et al.
2002/0052232 A1 * 5/2002 Kaminkow .................. 463/20
2002/0142821 A1 10/2002 Baerlocher
2003/0036430 A1 2/2003 Cannon
2003/0078089 A1 4/2003 Gray et al.
2004/0002372 A1 1/2004 Rodgers et al.
2004/0204229 A1 * 10/2004 Walker et al. ................. 463/20

FOREIGN PATENT DOCUMENTS

EP 0 945 837 A2 9/1999

| | | | |
|---|---|---|---|
| EP | 0984408 | A2 | 3/2000 |
| EP | 0 984 409 | A2 | 8/2000 |
| GB | 2353128 | | 2/2001 |
| WO | WO 00/12186 | | 3/2000 |
| WO | 02078804 | | 10/2002 |

OTHER PUBLICATIONS

Austin Powers Advertisement written by IGT, published in 2001.
Bonus Spin Advertisement written by IGT, published prior to 2000.
Double Diamond Run Advertisement written by IGT, published in 2001.
Fortune Cookie Advertisement written by IGT, published in 2000.
Jackpot Party Brochures and Articles, WMS Gaming, Inc., published in 1998.
Little Devil Advertisement written by IGT, published in 2000.
On the Money Article written by Strictly Slots, published in 2000.
Polly & Roger Advertisement written by Anchor Games, published in 2000.
Price is Right Advertisement written by IGT, published in 2001.
Price is Right Showcase Showdown Description from schuminweb.com, printed on Mar. 16, 2001.
Psycho Cash Beast Advertisement written by IGT, published in 1999.
Sphinx Advertisement written by Atronic Casino Technology, Ltd., published in 2000.
Take Your Pick Advertisement written by IGT/Anchor Gaming, published in 1999.
Take Your Pick Article written by Strictly Slots, published in Mar. 2001.
Texas Tea Advertisement written by IGT, published in 2000.
Top Gear Advertisement written by Aristocrat, published in 1995.
Wheel of Fortune Advertisement written by IGT, published in 1997.
Winning Streak Advertisement written by Aristocrat, published in 1994.
A Salute to Game Shows, [online] Retrieved from the Internet: <URL http://game-shows.chris-place.com/shows/price-is-iright/pricing-games.htm [Downloaded Oct. 25, 2007] (10 pages).
Top Dollar Advertisement, written by IGT, published in 1998.
Wheel of Fortune Advertisement, written by IGT, published in 1998.
Wheel of Fortune Video Advertisement, written by IGT, published in 1998.

* cited by examiner

FIG.13

118, 120, 122

| AWARD | PROBABILITY |
|---|---|
| 5 | 5 % |
| 10 | 10 % |
| 15 | 20 % |
| 20 | 20 % |
| 25 | 20 % |
| 30 | 10 % |
| 35 | 10 % |
| 40 | 5 % |
| TOTAL | 100 % |

FIG.14

124, 128, 126

| SET | PROBABILITY |
|---|---|
| A | 40.00% |
| B | 40.00% |
| A&B | 20.00% |
| | 100.00% |

400

| SYMBOL (402) | VALUE (404) | PROBABILITY (406) |
|---|---|---|
|  402a | 10 (404a) | 20% (406a) |
|  402b | 5 (404b) | 50% (406b) |
|  402c | 25 (404c) | 5% (406c) |
|  402d | 20 (404d) | 10% (406d) |
|  402e | 10 (404e) | 15% (406e) |

Spin the reels again to indicate more symbols.

The second and fifth reels only have one symbol to go!

Good job!! All of the symbols on the fifth reel have been chosen. You win!

GAMING DEVICE HAVING A PLURALITY OF SYMBOL GENERATORS AND ACCUMULATION GAME WITH MULTIPLE INDEPENDENT TERMINATING CONDITIONS

PRIORITY CLAIM

This application is a continuation-in-part of and claims the benefit of U.S. patent application Ser. No. 09/822,697, filed Mar. 30, 2001 now U.S. Pat. No. 6,796,899, which is incorporated in its entirety herein.

CROSS REFERENCE TO RELATED APPLICATIONS

This application is related to the following commonly-owned patent applications: "Image Matching Gaming Method," Ser. No. 09/395,034, now U.S. Pat. No. 6,346,043; "Gaming Device Having Pyramid Bonus Scheme," Ser. No. 09/656,702, now U.S. Pat. No. 6,439,995; "Gaming Device Having A Method For Randomly Generating A Bonus Round Outcome," Ser. No. 09/679,251, now U.S. Pat. No. 6,569,016; "Gaming Device Having A Bonus Round With Multiple Random Award Generation And Multiple Return/Risk Scenarios," Ser. No. 09/678,989, now U.S. Pat. No. 6,776,711; "Gaming Device With Prize Bonus Scheme Having Multiple Award Levels," Ser. No. 09/602,140, now U.S. Pat. No. 6,688,977; "Gaming Device With Bonus Scheme Providing Increased Reward For Selecting Related Symbols," Ser. No. 09/605,023, now U.S. Pat. No. 6,669,559; "Gaming Device Having A Multiple Selection Group Bonus Round," Ser. No. 09/605,107, now U.S. Pat. No. 6,511,375; "Gaming Device Having Multiple Choice Large Award Bonus Scheme," Ser. No. 09/686,284, now U.S. Pat. No. 6,875,108; "Gaming Device Having A Multiple Selection Set Bonus Scheme," Ser. No. 09/680,592, now U.S. Pat. No. 6,602,135; "Gaming Device Having An Indicator Selection With Probability-Based Outcome Bonus Scheme," Ser. No. 09/981,163, now U.S. Pat. No. 6,783,457; "Gaming Device Having A Bonus Scheme Including A Plurality Of Selection Groups With Win-Group Outcomes," Ser. No. 09/981,084, now U.S. Pat. No. 6,932,701; "Gaming Device Having A Multiple Selection And Award Distribution Bonus Scheme," Ser. No. 09/688,635, now U.S. Pat. No. 6,599,185; "Gaming Device With A Bonus Scheme Providing Awards From Multiple Value Sets Having Incrementing Value Orders," Ser. No. 09/978,913, now U.S. Pat. No. 6,688,975; "Gaming Device Having Achievement Criteria For Advancement," Ser. No. 09/964,022, now U.S. Pat. No. 6,796,900; "Apparatus And Method For Modifying Generated Values To Determine An Award In A Gaming Device," Ser. No. 09/957,018, "Gaming Device Having A Multiple Round Game That Includes Player Choices And Processor Choices," Ser. No. 09/966,855, now U.S. Pat. No. 6,609,974; "Gaming Device Having An Indicator Selection With Probability-Based Outcome Bonus Scheme," Ser. No. 09/990,693, now U.S. Pat. No. 6,676,516; and "Gaming Device With Signified Reel Symbols," Ser. No. 09/990,484, now U.S. Pat. No. 6,558,254; "GAMING DEVICE HAVING A BONUS SCHEME WITH MULTIPLE POTENTIAL AWARDS SETS," Ser. No. 10/652,457, "GAMING DEVICE HAVING A PLAYER SELECTION GAME," Ser. No. 10/954,132, and "GAMING DEVICE HAVING A BONUS SCHEME WITH MULTIPLE POTENTIAL AWARD SETS," Ser. No. 10/949,088.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Primary and secondary games in gaming machines generally result in a win or a loss for the player. In a slot machine game, the game ends when the reels stop and the gaming device analyzes the symbol combinations to determine if one or more winning outcomes exist. In a poker game, the game randomly deals cards, the player has one or more opportunities to randomly generate one or more new cards and the player wins or loses based on a final combination of cards. In a blackjack game, the player's card values add until the player's hand beats the dealer's hand, loses to the dealer's hand or busts.

In each of these well known games, the game ends after a number of random generations. In slot machines, the basic game ends after one random generation. In poker machines, the game ends after one, two or more random generations, depending on the type of poker game. In blackjack machines, the number of generations varies, but has a limit, namely, the number until the card denominations add to or exceed twenty one.

Known bonus games employ a plurality of game ending strategies. One known strategy is a do-until strategy in which the player picks until picking a bonus terminator. European Patent Application No. EP 0 945 837 A2 filed on Mar. 18, 1999 and assigned on its face to WMS Gaming, Inc. discloses a bonus game in which a player has one or more opportunities to select masked bonus awards. When the player selects a masked award, the game reveals the selection and provides the award to the player. The player selects until all the selections are selected or until selecting a game terminator. In other games, the player selects from a group of selections until two or more matching selections are picked by the player.

Another known bonus game ending strategy includes letting the player decide whether to end the game with a particular result or trade results with the hope of obtaining a higher award. The TOP DOLLAR® gaming device, which is manufactured and distributed by the assignee of this application, provides the player with three offers and a final award. When an offer is given, the player may accept or reject it. If the player accepts an offer, the player receives the accepted bonus amount and the bonus round terminates. If the player declines an offer, the game generates another offer for the player, which may be a higher or lower award. The game is similar to poker, wherein the player has a limited opportunity to better an outcome.

In each of the foregoing games, the game ends upon a limited number of random generations or upon a result of the random generations. In an effort to create a more entertaining and exciting game, a need exists to create a gaming machine or device having new apparatus and method for ending a game and combine these with the known methods described above.

Gaming device manufacturers strive to make gaming devices that provide as much enjoyment and excitement as possible. Providing a game in which a player has an opportunity to win potentially large awards or credits is one way to enhance player enjoyment and excitement.

The games in many existing gaming machines, such as traditional slot machines, are based upon the concept of spinning reels. The game ends when the reels stop spinning and the gaming device analyzes the symbol positions to determine if one or more winning outcomes exist. Generally, in slot machines, a game ends after the random generation(s) for the reels.

There are various accumulation games. In known accumulation games, the game usually does not end after one random generation. The credits for the game accumulate throughout the game. The game ends after two or more random generations depending on the type of game.

While such schemes offer advantages in player appeal and excitement, there is a continuing need to develop new and interesting types of games that allow players to accumulate larger awards and increase the level of player excitement and enjoyment.

SUMMARY OF THE INVENTION

The present invention provides a gaming device and in particular a bonus scheme of a gaming device that enables players to accumulate awards in a plurality of sets until one of the sets is completed. Each set includes at least one and preferably a plurality of components. The gaming device enables a player to pick a plurality of selections from a group of masked selections. Preferably, a component from one of the sets is associated with each selection. A component from two or more of, or each of the sets, could also be associated with a selection.

In the preferred embodiment, the components of a set include values, modifiers and bonuses; however, it should be appreciated that other components could be part of or associated with a set or a plurality of sets in addition to or in place of the values, modifiers and bonuses. At least one and preferably a plurality of designated or predetermined components are necessary to complete a set. For instance, in the preferred embodiment, each set has a plurality of value components. To complete such set, all of the value components in such set must be obtained or selected by the player. It should be appreciated that the number of or type of components in each set necessary to complete the set may vary and that the components necessary to terminate each set is preferably, but does not have to be, identical or similar. For example, a bonus component may be required to complete one of the sets.

Each component preferably has a symbol or other identifier associated with the component, and particularly the value components or the components necessary to complete a set. Thus, when the player picks one of the selections from the group of masked selections (which the game preferably simultaneously displays to the player), the game reveals the value and the identifier or symbol associated with one of the sets (i.e., to identify the component of the appropriate set). In one embodiment of the invention, an identifier or symbol is associated with a selection before a player picks from the group of masked selections. In another embodiment, the player picks the selection and then the symbol or identifier is associated with the selection before revealing the selection to the player. It should also be appreciated that the processor of the gaming device could randomly determine the selections. In accord with one aspect of the invention, the components are weighted such that the processor is more likely to assign one component to a selection over another component.

The player preferably receives the award associated with the first set completed; however, the player could receive an award from another completed set, such as the last set completed or from an uncompleted set. The award provided to the player is preferably based on the components of the appropriate set, such as the first set completed in the preferred embodiment. In the preferred embodiment, the award provided to the player includes the sum of the value components achieved, modified by any modifiers such as a multiplier (if any modifiers are obtained before the first set is completed) and the addition of any bonuses (if any bonuses are obtained before the first set is completed).

As indicated above, another aspect of the invention includes bonuses or bonus credits which are associated with the selections. If a player picks a selection and generates a bonus, the bonus is added to the designated set, a combination of the sets, or to all of the sets.

As also indicated above, in yet another aspect of the invention a modifier, such as a multiplier, is associated with one or more of the selections. If a player picks a selection, which includes a modifier, the modifier changes the value of a set based on the modifier. A modifier may be associated with any designated set, a combination of the sets, or all of the sets.

The present invention relates in general to a gaming device, and more particularly to a gaming device including an accumulation game with multiple independent terminating conditions.

In one embodiment of the present invention, the gaming device includes a plurality of symbol generators or symbol indicators. Each of the symbol generators or symbol indicators is associated with a symbol set having a plurality of symbols. The symbol sets may include the same symbols or may include one or more or all different symbols. One, some or all of the symbols in each symbols set is associated with an outcome, such as a value. In one embodiment, each symbol has a probability of being indicated or generated. The probabilities may be the same or different.

Upon activation of the symbol generators or symbol indicators, for each symbol generator or symbol indicator, the gaming device determines or calculates which symbol to indicate based on the probabilities associated with each of the symbols associated with that symbol generator. Each symbol generator or symbol indicator indicates the determined symbol. The gaming device marks, indicates or flags each indicated symbol as having been generated in the game.

The gaming device continues to activate the symbol generators in the game until a designated number of symbols in the symbol set have been indicated. For example, the gaming device continues to generate symbols until all of the symbols in a symbol set associated with one of the symbol generators have been indicated, marked or flagged in the game. After all of the symbols in at least one symbol set have been marked, the gaming device provides an award to the player. In one embodiment, the award is based on values accumulated for the symbol generator or symbol indicator for which all of the associated symbols have been first indicated. In one embodiment, if a symbol is repeated on a symbol generator or a symbol indicator the value of that symbol is added to the accumulated value or total value for that symbol generator or symbol indicator.

The game may be implemented in a base game or a bonus game. The symbol generators or symbol indicators may be reels, wheels, dice or any other suitable symbol generator.

In one embodiment, the display device includes a corresponding accumulation meter for each symbol generator or symbol indicator. The accumulation meter indicates to the player which symbols have been indicated, marked or flagged. In one embodiment, each accumulation meter displays the value associated with each indicated symbol on the corresponding symbol generator or symbol indicator and a total of the values associated with all of the symbols indicated on that symbol generator or symbol indicator for the game. The accumulation meter displays the accumulation of all of the values for each corresponding symbol generator or symbol indicator for each round in a value indicator. For example, in one embodiment, the symbol indicators are reels, if a reel indicates a symbol associated with a value of 5 in the first round and a symbol associated with a value of 20 in the second round, the corresponding accumulation meter displays a total value of 25 in the value indicator for the corresponding symbol generator.

If the designated number of the symbols in one of the symbol sets associated with the symbol generators or symbol indicator has not been indicated, the gaming device activates all the symbol generators or symbol indicator again to indicate another round of symbols. The gaming device marks each indicated symbol. Each accumulation meter displays the value for each symbol indicated on the corresponding symbol generator or symbol indicator. The gaming device continues to indicate symbols until all of the symbols in a symbol set of at least one of the symbol generators have been marked. The gaming device provides the player with an award.

In one embodiment, the award provided to the player is based on the accumulated value indicated in the value indicator of the accumulation meter corresponding to the symbol generator with the designated number of symbols marked. In an alternative embodiment, the gaming device provides the player a set amount based on which symbol generator has all of the symbols in its associated symbol set marked first.

In another embodiment, each symbol is associated with a value. The value of each symbol is displayed on each symbol generator next to each symbol. The gaming device includes an accumulation meter corresponding to each symbol generator. The symbols correspond to regions or parts of scenes displayed on the associated accumulation meter. When a symbol is indicated, the associated region or part of the corresponding scene is highlighted or filled in on the accumulation meter.

It should be appreciated that any suitable plurality of mechanical or virtual symbol generators could be used in the present invention. In one embodiment, the gaming device initiates the spinning of the symbol generators. In an alternative embodiment, the gaming device enables the player to activate or spin the reels. In one embodiment, all of the reels begin spinning at the same time. In another embodiment, the reels start spinning sequentially. The reels may stop spinning simultaneously or sequentially. In one embodiment, the gaming device enables the player to activate or spin a designated number of the reels. In another embodiment, the gaming device automatically spins less than all of the reels.

It is therefore an advantage of the present invention to provide a gaming device having an accumulation game and a terminating condition.

Another advantage of the present invention is to provide a gaming device having a game which provides players with an increased level of excitement arising from which symbol generator will have all of its associated symbols marked first.

It is therefore an advantage of the present invention to provide a gaming device having a plurality of potential award sets and a player obtains an award associated with one of the award sets.

Although the present invention is discussed relative to a bonus game of a gaming machine, it should be appreciated that the present invention could be employed as a primary game in a gaming device. Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 13 is a schematic diagram illustrating an award distribution table;

FIG. 14 is a schematic diagram illustrating a component distribution table;

DETAILED DESCRIPTION OF THE INVENTION

Figure 1A:
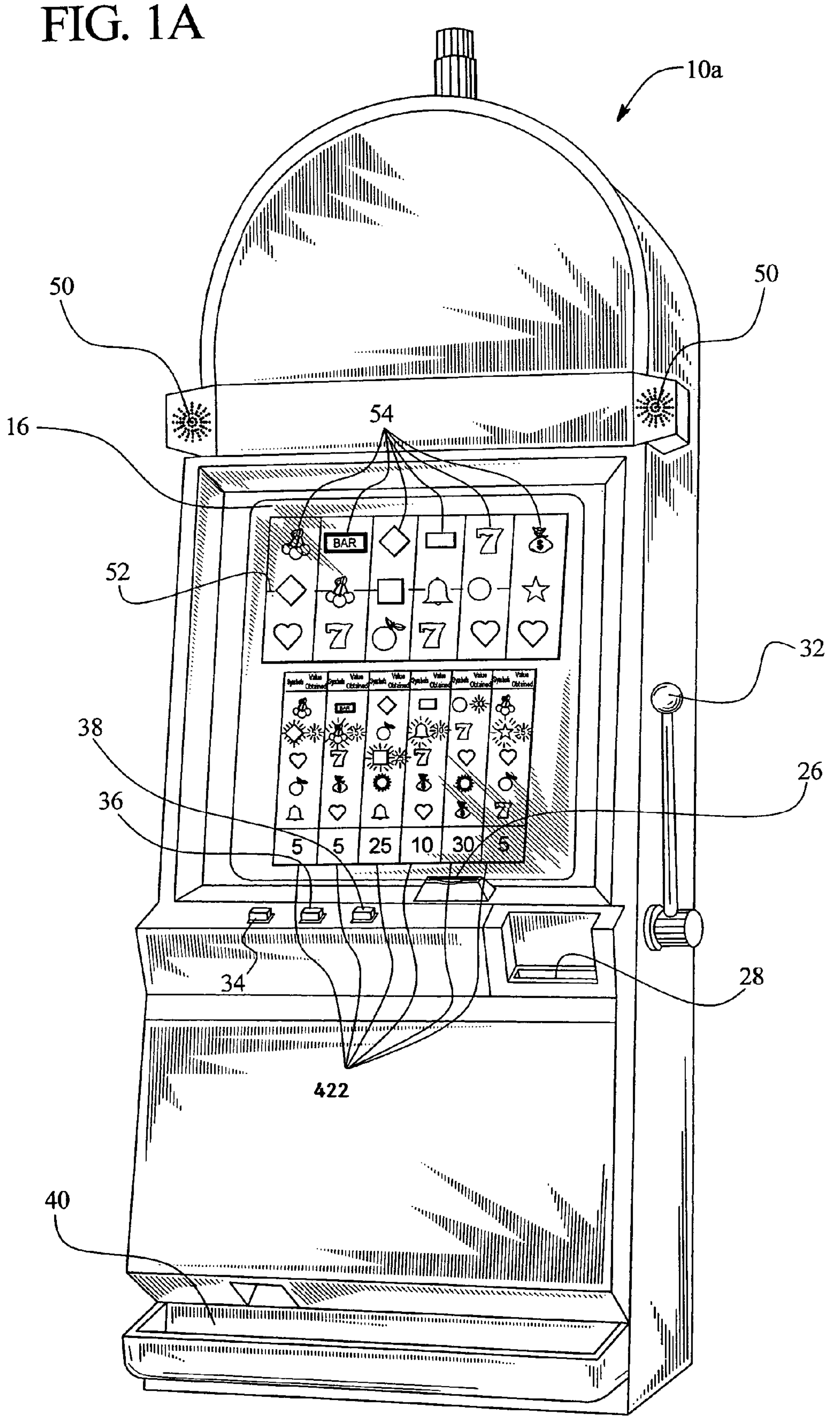
FIG. 1A is a front-side perspective view of one embodiment of the gaming device of the present invention.
Figure 1B:
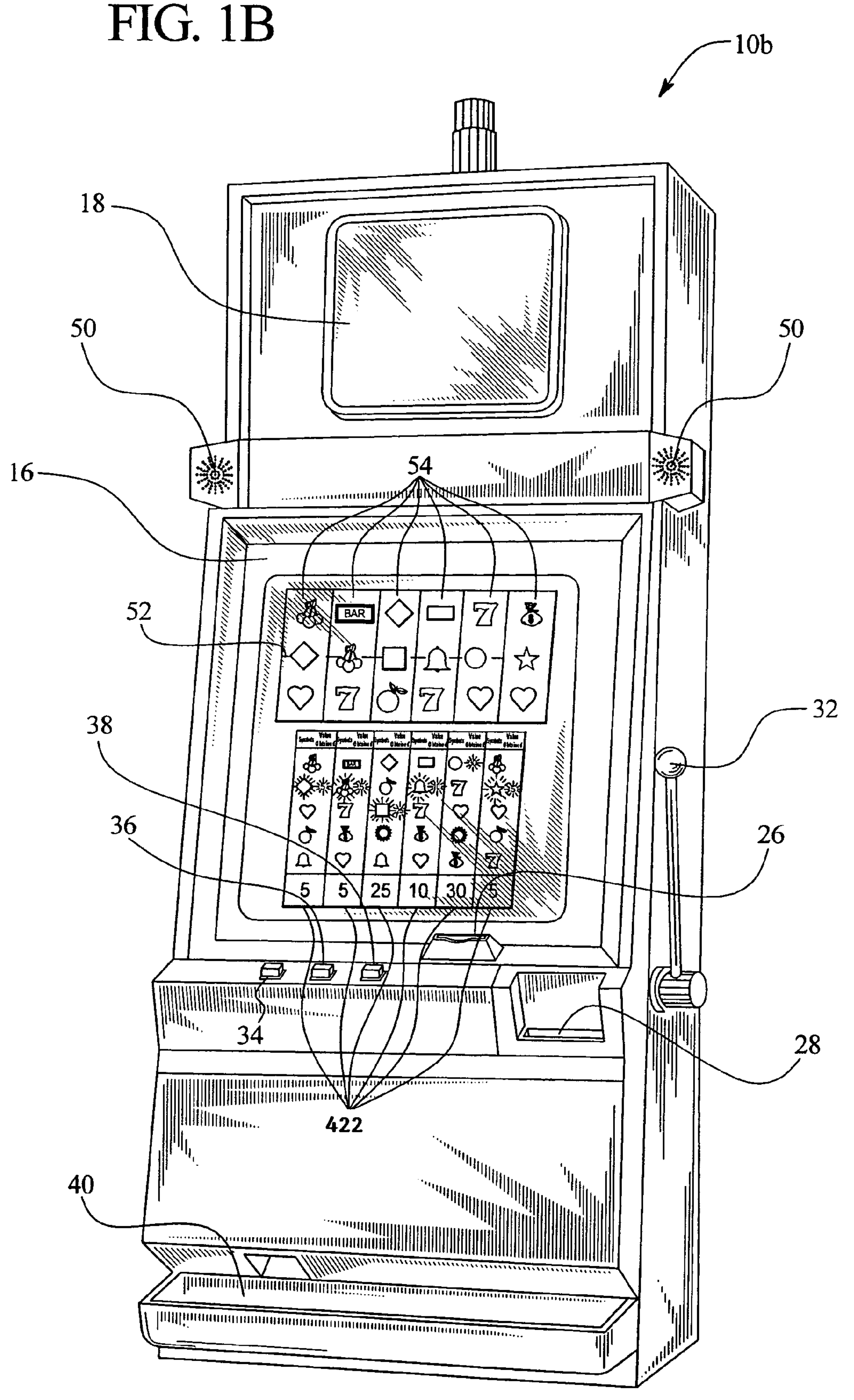
FIG. 1B is a front-side perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
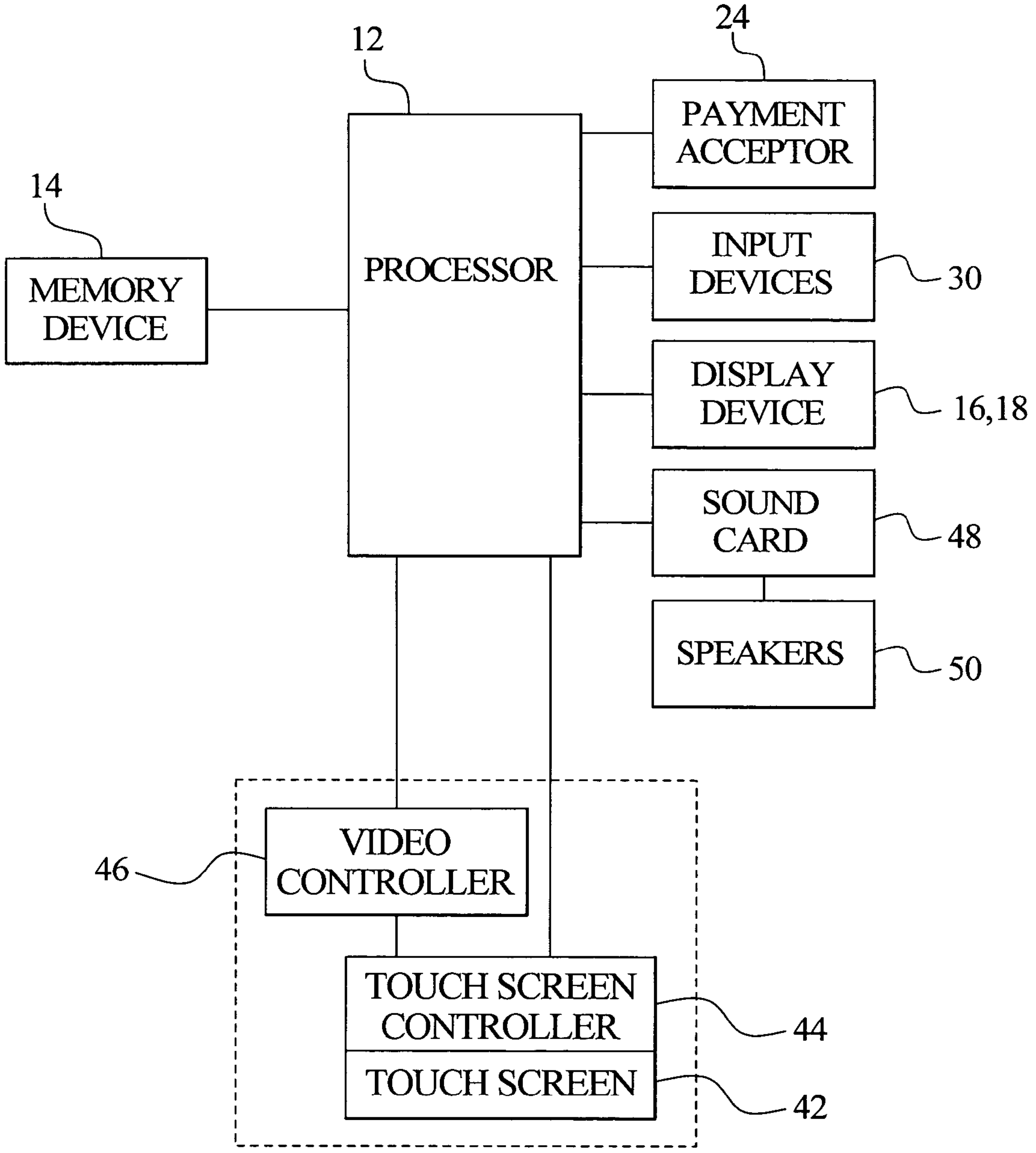
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices 16, 18 controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, the gaming devices includes a credit display which displays a player's current number of credits, cash, account balance or the equivalent. In one embodiment, as seen in FIGS. 1A and 1B, the gaming device includes at least one accumulation meter 122. In one embodiment, gaming device includes a bet display which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen 42 with an associated touch-screen controller 44. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Figure 2B:
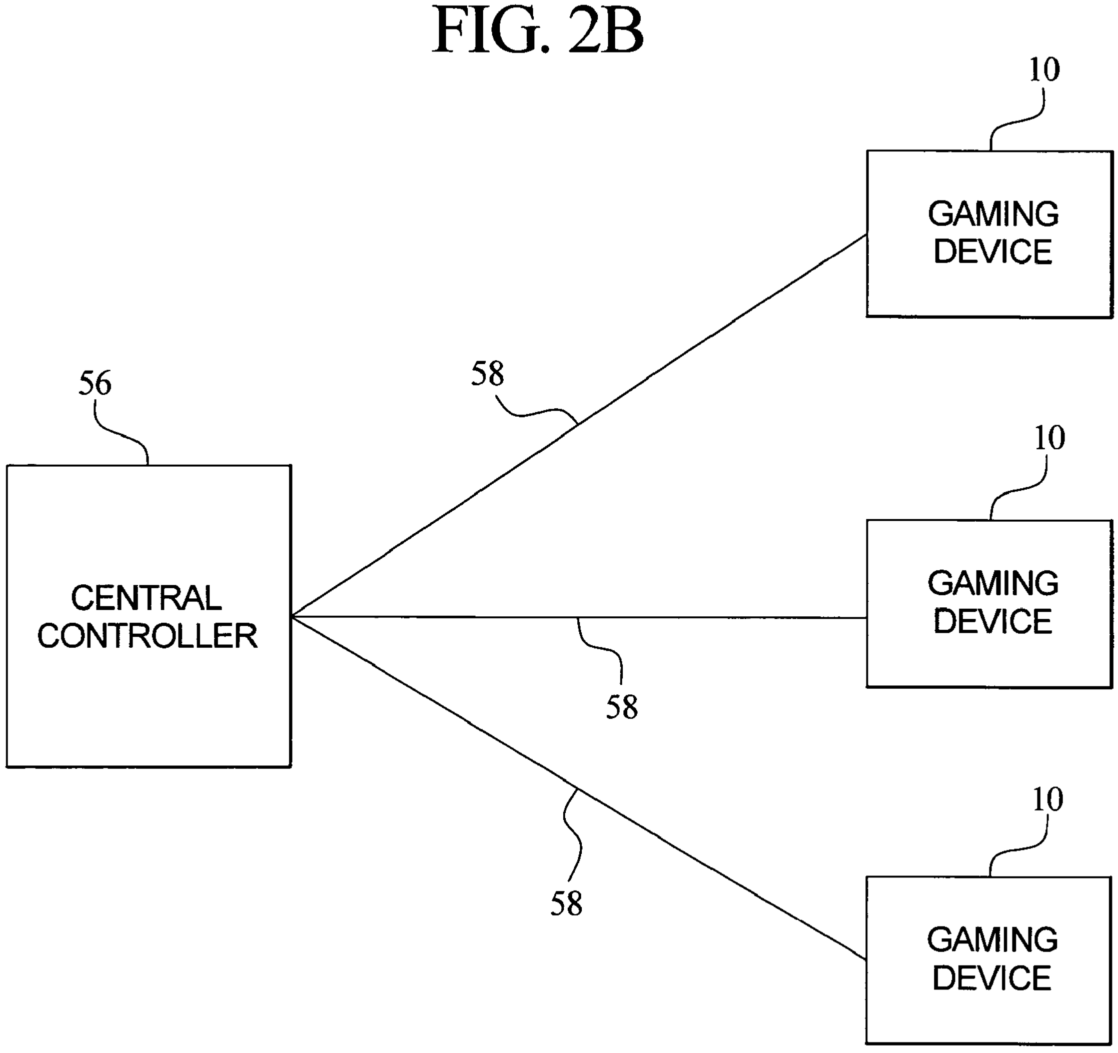
FIG. 2B is a schematic block diagram illustrating a plurality of gaming terminals in communication with a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller 56.

In one embodiment, the game outcome provided to the player is determined by a central server or controller 56 and provided to the player at the gaming device of the present invention. In this embodiment, each of a plurality of such gaming devices is in communication with the central server or controller 56. Upon a player initiating game play at one of the gaming devices, the initiated gaming device communicates a game outcome request to the central server or controller 56.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

The accumulation game of the present invention can be provided to the player as a primary or base game or as a secondary or bonus game. If the accumulation game is provided as a secondary game, then the gaming device can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

If the accumulation game of the present invention is incorporated as a primary or base game, then in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

If the accumulation game of the present invention is incorporated as a primary or base game or as a secondary or bonus game, the accumulation game includes one or more paylines 52 as illustrated in FIGS. 1A and 1B. The paylines may be horizontal, vertical, circular, diagonal, angled or any combination thereof. In one embodiment, the gaming device displays at least one and preferably a plurality of reels 54, such as three to six reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In one embodiment, if the reels 54 are in video form, the plurality of simulated video reels 54 are displayed on one or more of the display devices as described above. Each reel 54 displays a plurality of indicia or symbols such as bells, hearts, fruits, numbers, letters, bars or other images which preferably correspond to a theme associated with the gaming device.

Multiple Potential Award Sets

Figure 3:
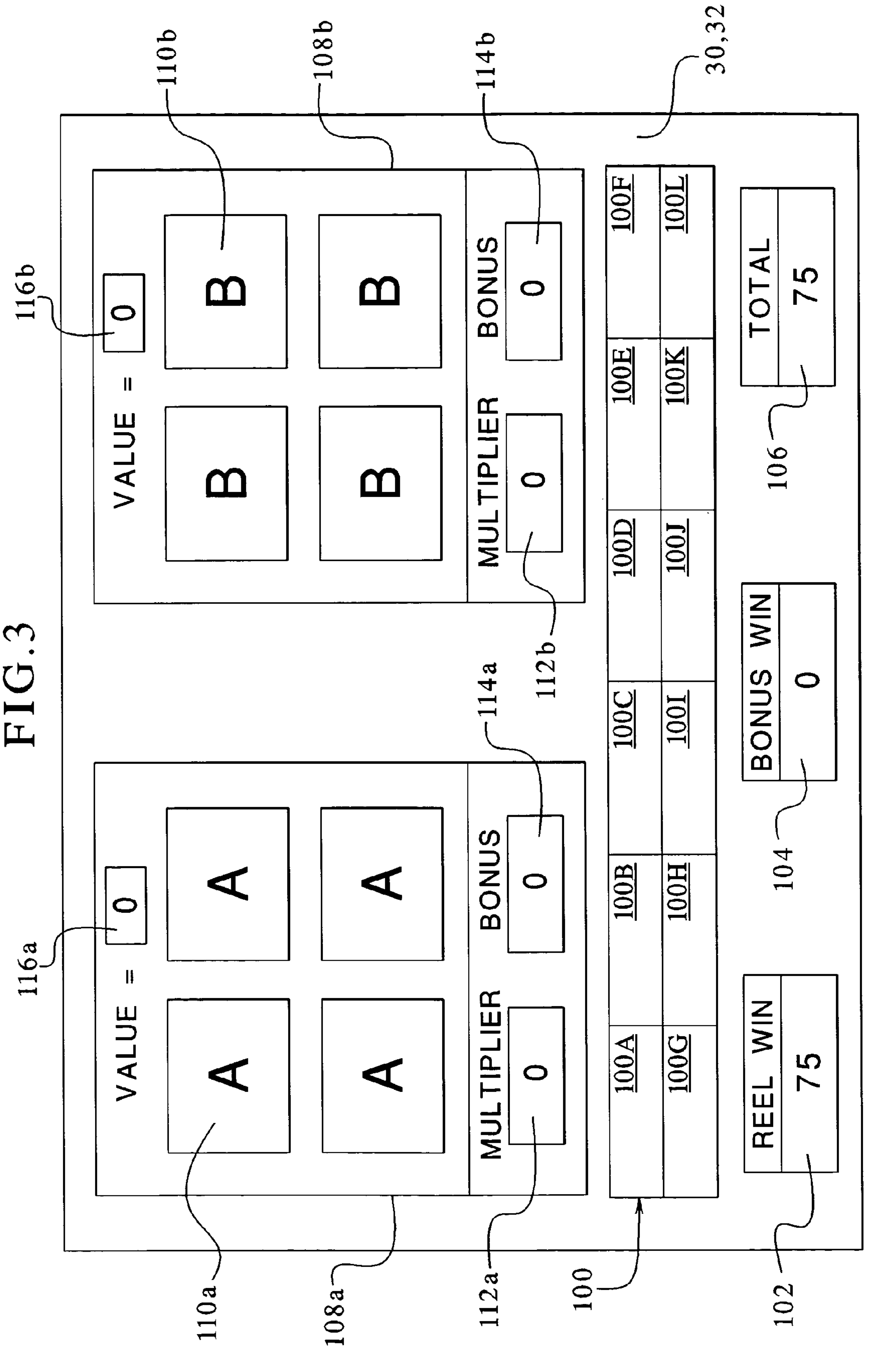
FIG. 3 is an enlarged front elevational view of one of the display devices of FIGS. 1A and 1B, which illustrates one general embodiment of the present invention.
Figure 4:
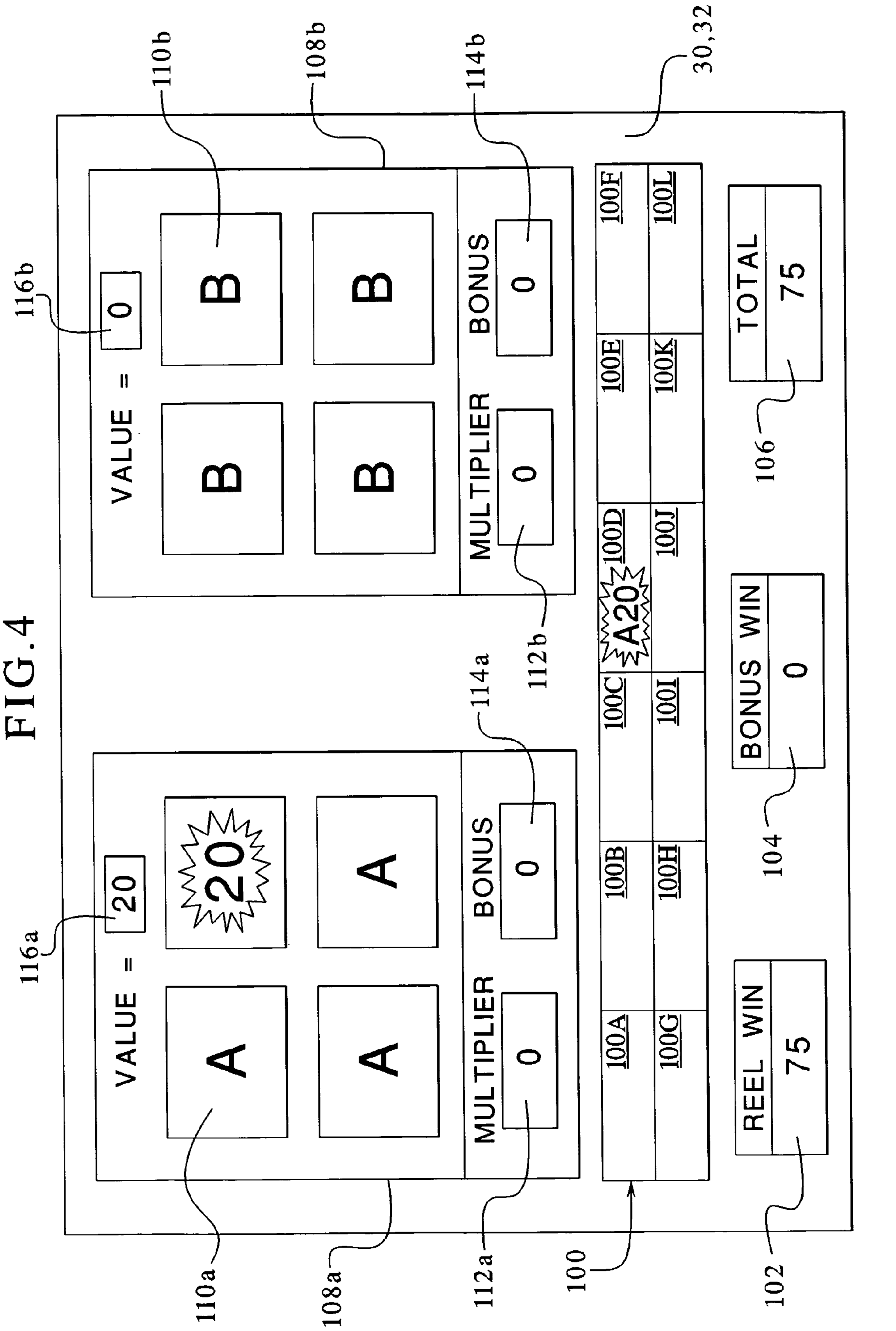
FIG. 4 is an enlarged front elevational view of one of the display devices of FIGS. 1A and 1B illustrating a first selection by a player.

Referring now to FIG. 3, one general embodiment of the present invention includes a display on a display device 30 or 32 having a plurality of masked selections 100 (including selections 100*a*, 100*b*, 100*c*, 100*d*, 100*e*, 100*f*, 100*g*, 100*h*, 100*i*, 100*j*, 100*k* and 100*l*) and at least two sets 108*a* and 108*b*. The selections 100 are preferably simulated selections on the display device 30 or 32, and the display device preferably includes a touch screen 50 and associated touch screen controller 52 (see FIG. 2). Each selection is a separate area of the display device adapted such that when a player touches an area, the touch screen 50 and controller 52 send a discrete input to the processor 38.

The selections may alternatively be electromechanical input devices 44 mounted to the cabinet of the gaming device 10 (see FIG. 2). The electromechanical selections are adapted such that when a player touches or presses a selection, the input device 44 typically closes a circuit (not illustrated), which sends a discrete input to the processor 38. One preferred embodiment of the present invention includes twelve selections, 100*a* through 100*l* as indicated above; however, the present invention may include any suitable number of selections. All of the selections are preferably masked, although it should be appreciated that certain selections may not be masked. Any symbol or indicia could be used in connection with a masked selection as desired by the implementor.

The paid display 102 is preferably simulated on the display device 30 or 32, as illustrated, but may alternatively be an electromechanical device mounted to the cabinet of the gaming device 10. The paid display 102 indicates the value of a recent award paid to the player and is distinguishable from the credit display 16, which shows the recent award plus the player's previous total award.

The bonus game display 104 shows the award received by a player for completing a set or finishing the game. In addition, the total display 106 shows the total credits that the player received in the bonus game, which is the sum of the paid display 102 and the bonus game display 104.

In the preferred embodiment, each set 108*a* and 108*b* preferably includes a plurality of components, and specifically a plurality of value components 110*a* and 110*b*, respectively, having symbols or component identifiers associated with each set, at least one modifier component 112*a* and 112*b*, respectively, and at least one bonus component 114*a* and 114*b*, respectively. Each set includes at least one component and preferably includes a plurality of components as desired by the implementor. The components may be black or related to indicia such as symbols, which may be letters, numbers, shapes or any other characteristic desired by the implementor. The player generates the value components displayed in the sets by picking the selections. When a player generates all the value components located within a set, the bonus game ends. Thus, a player's objective is to complete the set having the highest award and receive the award associated with that set. Preferably an award consists of credits, but the award may include other types of awards such as merchandise as desired by the implementor of the game.

As shown in FIG. 3, the sets 108*a* and 108*b* each include at least one value component. Sets 108*a* and 108*b* each include four value components 110*a* and 110*b*, respectively, but it should be appreciated that a set may include one value component or several value components. The sets 108*a* and 108*b* may also include other components. In FIG. 3, the sets 108*a* and 108*b* include modifier components 112*a* and 112*b*, respectively, and bonus components 114*a* and 114*b*, respectively. These components are preferably simulated indicators on the display device 30 or 32, as illustrated, and are alternatively electromechanical devices mounted to the cabinet of the gaming device 10. Each set 108*a* and 108*b* also includes total value displays 116*a* and 116*b*, respectively, for displaying the total value of each set.

The modifier component includes any modifiers such as multipliers that the player receives for that set. The modifiers may be any mathematical operation, calculation, value or factor desired by an implementor. Preferably, the modifier will be a multiplier. Modifiers may be associated with one set or more sets. It is contemplated that a player may receive a modifier in each set, one set or no sets. A modifier modifies a player's total value for a set. Therefore, the modifier changes the award for the set and enhances the player's excitement and enjoyment of the game.

The bonus component includes bonuses such as bonuses that a player receives during a game. The bonuses may be associated with one set or several sets within a game. In a game, a player may receive bonuses in each set or in all of the sets. Once a set is complete, the bonuses are added to the value components to attain a total award for a set.

The set value displays 116*a* and 116*b* displays the total value of the sets 108*a* and 108*b*, respectively, where the total value is determined as the sum of the value components and any bonuses, modified by any modifiers. The total value is preferably the award associated with the set. Thus, when a set is completed by a player and the game ends, the award shown in the set value display in the set provided to the player is transferred to the bonus win game display 104.

FIG. 3 illustrates one embodiment of a display device 30 or 32, as it may appear to a player when the game begins. The value components 110*a* and 110*b* in the sets 108*a* and 108*b* may be individually generated (i.e., a selection relates to a specific component) or generically generated (i.e., a selection relates to any value component in the set). The selections 100 are preferably masked when the game begins. The selections 100 provide the components as a player picks the selections. The selections are unmasked as the selections are picked. After being picked, the selections preferably remain unmasked until a set or required components of a set are completed and the game ends. Alternatively, a selection may be re-masked and returned to the group of selections the player can choose from.

The modifier components 112*a* and 112*b*, bonus components 114*a* and 114*b* and the set values 116*a* and 116*b* all begin the game at a predetermined value. In addition, the bonus win game display 104 and the total award display 106 start at a predetermined value. The paid display 102 starts with a value associated with a previous game, games such as the bonus triggering game.

FIGS. 4 through 9 illustrate an example play of the game from beginning to end, which occurs when a set is completed by a player. In FIGS. 4 through 9, only six picks are needed to complete the game. It should be appreciated that more or less picks may be needed to complete a game. The number of picks needed to complete a game depends on the number of sets, and the number of components in each set (including the components needed to complete a set).

The player starts the game by picking one of the masked selections 100. In this example, the player picks the selection 100D which is a value component. Each value component preferably has with a set indicator and a value. It should be appreciated that a value component may be associated with a set indicator, a value or any combination of indicators and values. In this example, the value component 110D has or is associated with an indicator "A" for the first set 108*a* and a value of "20." The value component is transferred to the first set 108*a* based on the set indicator. Once the value component is transferred to the first set 108*a*, the set value display 116*a* shows the present value of the first set, which is the cumulative value of the value components 110*a*, any bonuses in the bonus component 114*a*, modified by any modifiers in the modifier component 112*a*. In this example, the value of the bonus component 114*a* and the modifier component 112*a* are zero, therefore the set value display 116*a* shows the present value of the first set 108*a* after the first pick by the player, which is twenty.

Figure 5:
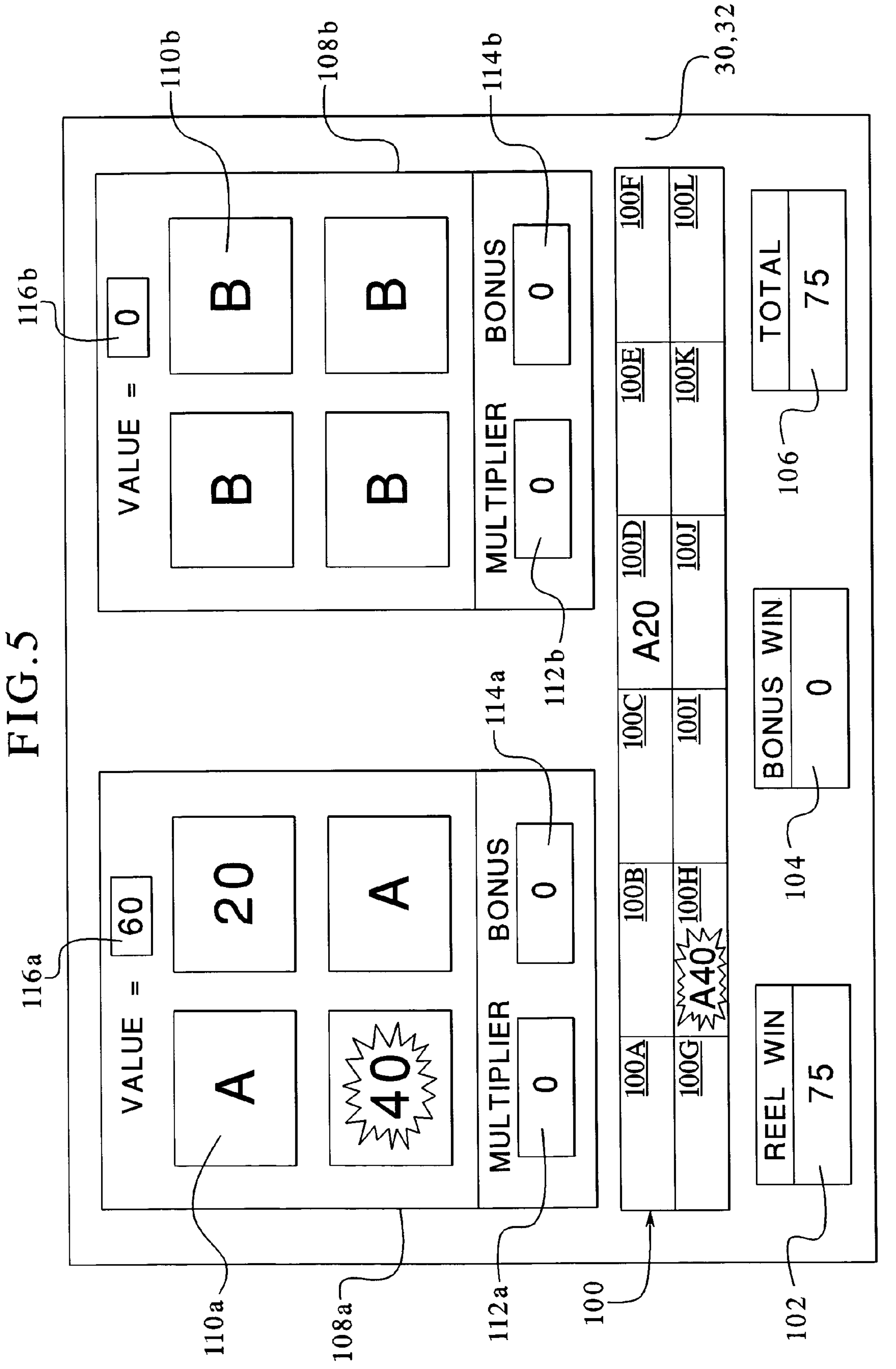
FIG. 5 is an enlarged front elevational view of one of the display devices of FIGS. 1A and 1B illustrating a second selection by a player.

FIG. 5 illustrates the second pick by the player in the game. The player picks selection 100H which is a value component which is associated with the first set 108*a* and has a value of "40." The second value component is transferred to the first set 108*a* and the total value or award for the set is shown in the set value display 116*a* which is sixty (i.e., the cumulative value of the value components, bonuses and modifiers associated with the first set 108*a*).

Figure 6:
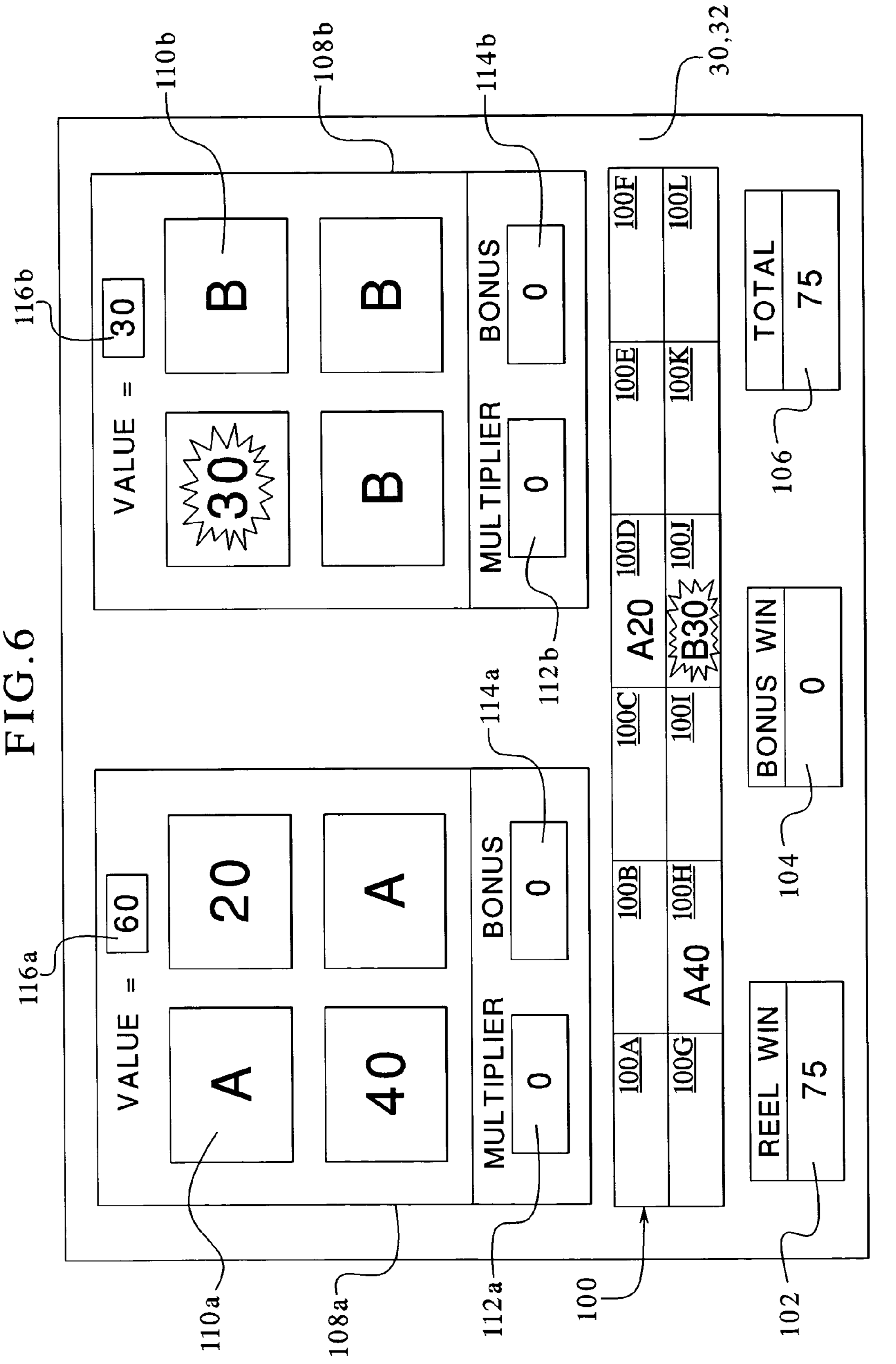
FIG. 6 is an enlarged front elevational view of one of the display devices of FIGS. 1A and 1B illustrating a third selection by a player.

FIG. 6 illustrates the player third selection 100J. The third selection 100J display a value component which has an indicator "B" that associates this component with the second set 108*b*. The value component has a value of "30" which is transferred to set 108*b*. The set value display 116*b* for the second set 108*b* shows the present value for the set. At this point, the second set 108*b* has a total value or award of thirty, which is the sum of any value components 110*b* and bonus components 114*b*, modified by the modifier component 112*b* for that set.

It should be appreciated that a player may complete either the first set 108*a* or the second set 108*b*. In the embodiment, a set is completed when all of the value components in the set have values. Preferably, the sets are not completed at the same time. If they are, both sets could be provided to the player or an alternative award may be provided to the player. The player's goal is to complete the set that will give the player the highest value for the game.

Figure 7:
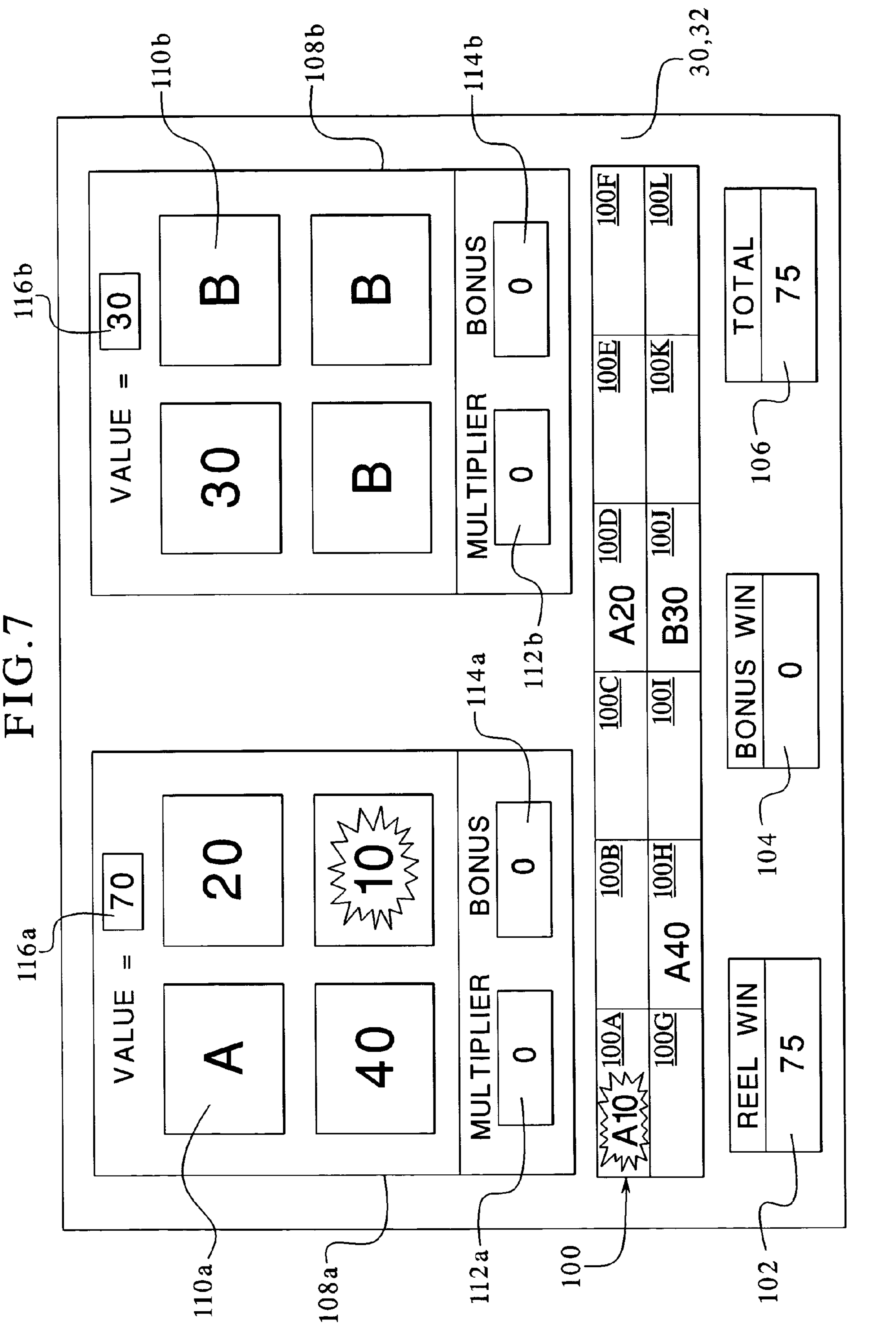
FIG. 7 is an enlarged front elevational view of one of the display devices of FIGS. 1A and 1B illustrating a fourth selection by a player.

FIG. 7 illustrates the player's fourth selection 100A, which provides a value component that includes an identifier associated with the first set 108*a*. The value of the value component is transferred to the first set 108*a*, as illustrated. The value of the first set 110*a* becomes seventy, as displayed in the set value display 116*a*.

Figure 8:
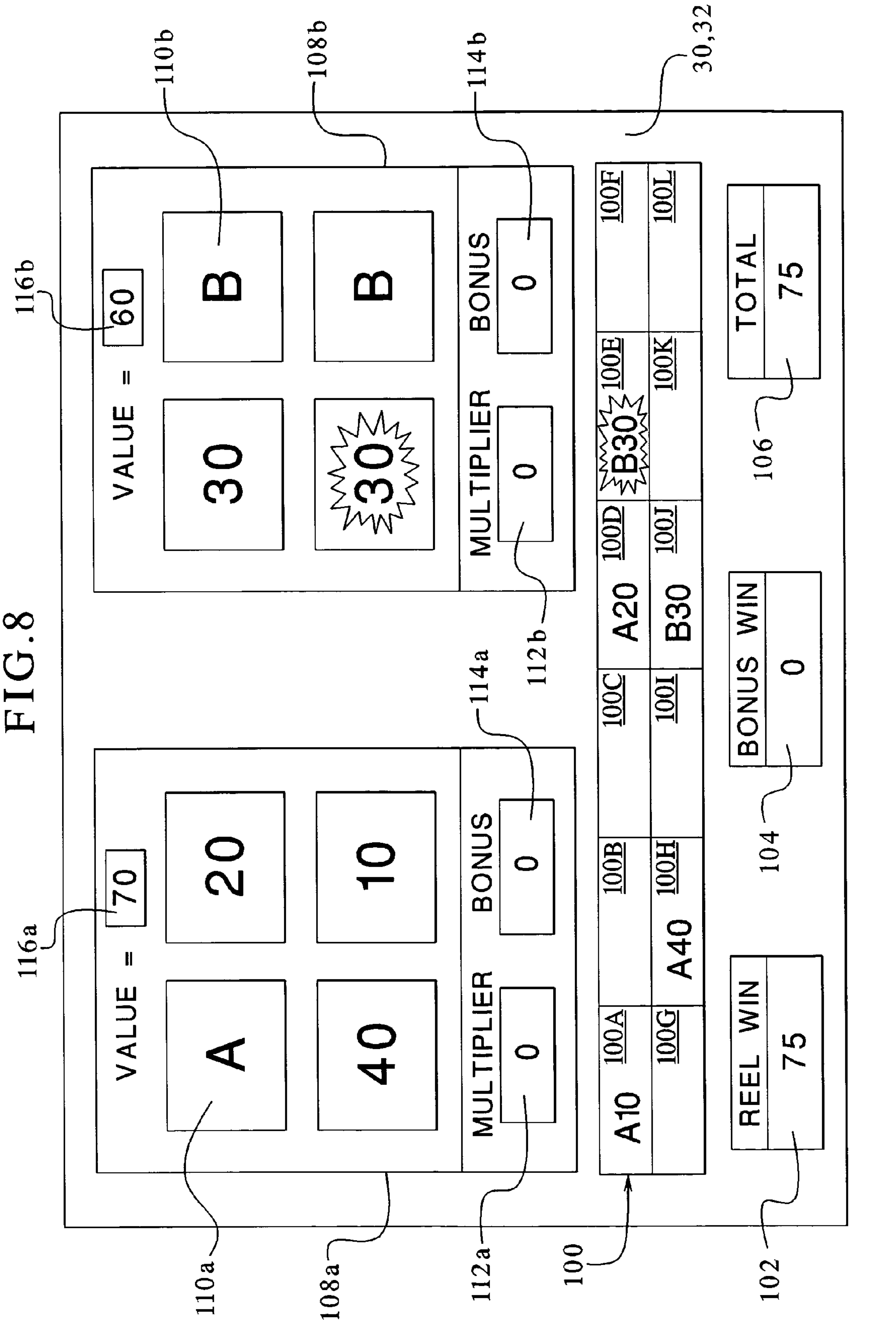
FIG. 8 is an enlarged front elevational view of one of the display devices of FIGS. 1A and 1B illustrating a fifth selection by a player.

FIG. 8 illustrates the player's fifth selection 100E which provides a value component which is associated with the second set 108*b*. The value "30" of the value component is transferred to the second set 108*b* and added to the total value of that set or shown in the set value display 116*b*.

Figure 9:
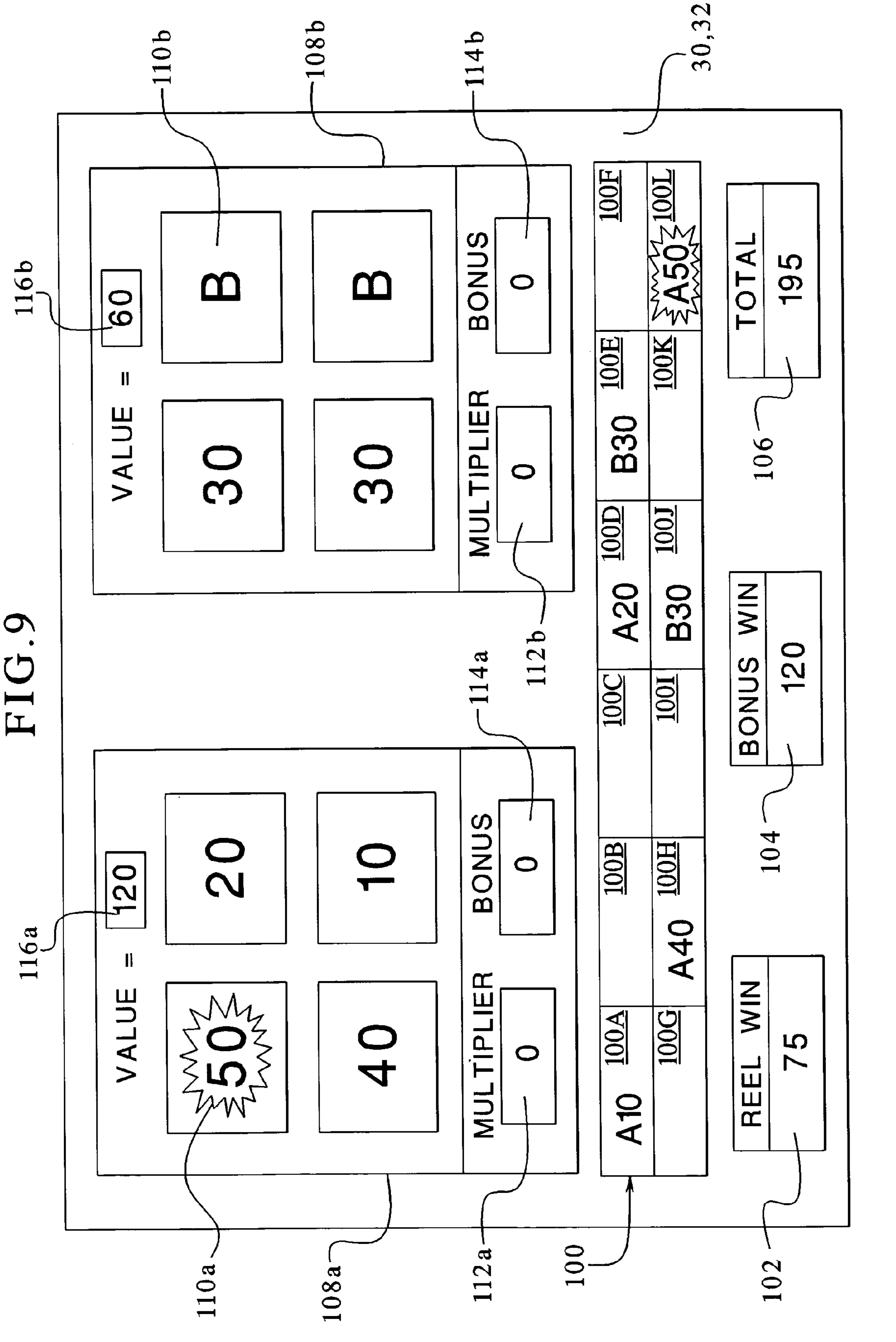
FIG. 9 is an enlarged front elevational view of one of the display devices of FIGS. 1A and 1B illustrating a final selection by a player that completes a set.

FIG. 9 illustrates the player's sixth selection 100L, which provides a value component associated with the first set 108*a*. The value "50" is transferred to the first set 108*a*, as illustrated. The value of the first set 108*a* is one hundred twenty, as displayed in the set value display 116*b* for the first set 108*a*.

The present value of the first set 108*a* is the sum of all four value components and any bonus components for that set, modified by any modifier components for that set. In this example, there are no bonus or modifier components, therefore the total award for set 108*a* is the sum of the value components 110*a*. It should thus be appreciated that the present invention can be employed with value components and without modifier, bonus or other components.

The sixth pick by the player was the final pick of the game because this pick completed the first set 108*a* which was the requirement of this embodiment. Once a set is complete in the preferred embodiment, the game ends and the player receives the total value or award associated with that set. In this example, the player receives the value indicated in the set value display 116*a* for set 108*a*, which is one hundred twenty. This value is now transferred to the bonus game display 104. Since the game has ended, the value in the paid display 102 is added to the value in the bonus game display 104 to give the player their total award shown in the total award display 106. In this example, the player receives seventy-five plus one hundred twenty to give them a total award of one hundred ninety-five.

It should be appreciated that the player could have completed the second set 108*b* before the first set 108*a*. Therefore, the outcome of the game is dependant on the selections 100 that the player picks during the game. In some games, the player may desire to complete one set before another because that set has a higher total award than the other set or sets. The uncertainty related to the completion of the sets enhances the player's excitement and enjoyment of the game.

In another embodiment of the game, a player picks a selection 100 and receives a bonus component associated with a particular set. The bonus component can be added to one or more sets or to all of the sets in a game. A game may have no bonus components or as many bonus components as desired by the implementor of the game, provided that the sets can be completed. It should also be appreciated that a bonus component can be used as a partial or complete set completion component (i.e., picking a bonus component is required to complete a set, is part of completing a set, equals two or more value components toward completion, or automatically completes a set).

Figure 10:
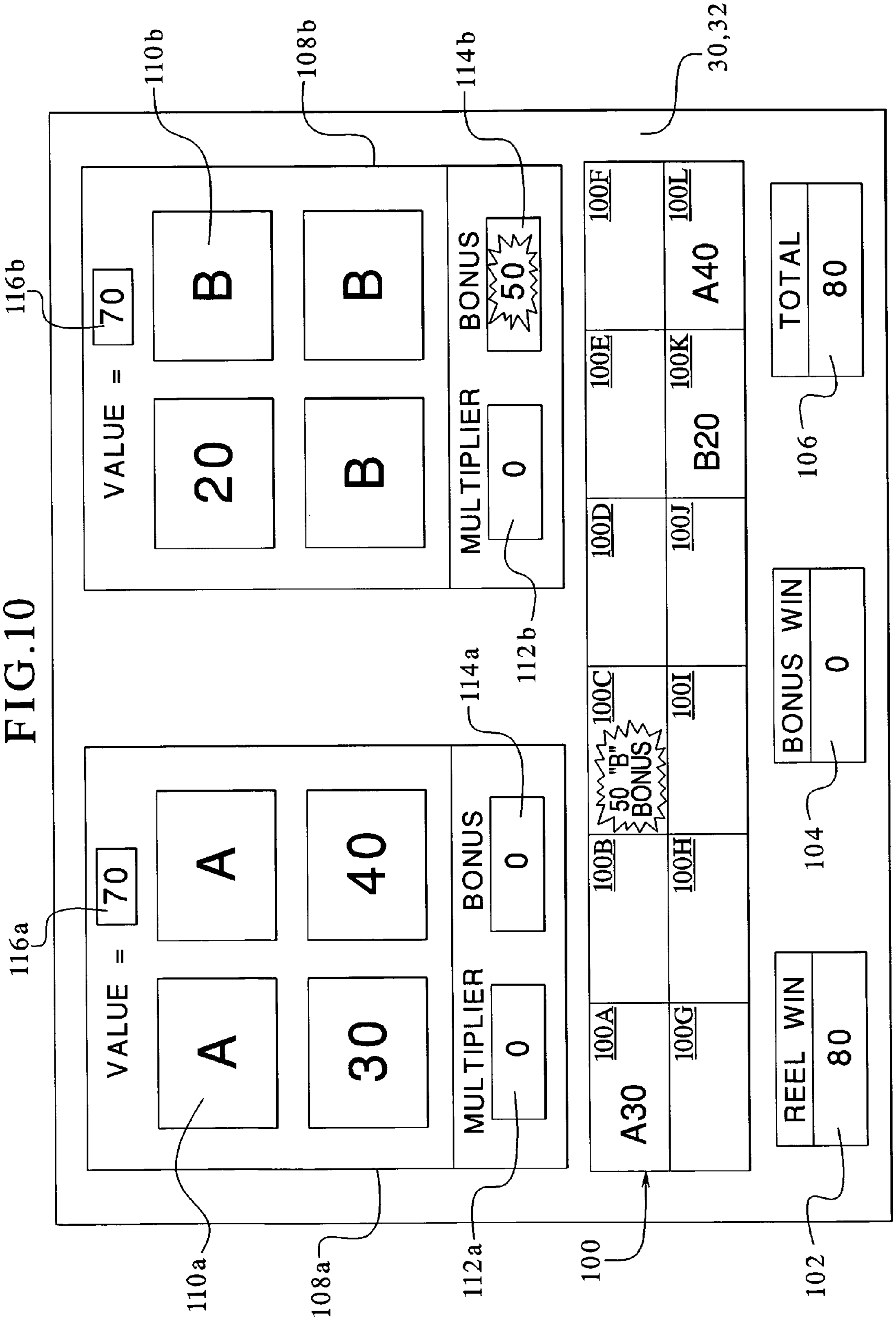
FIG. 10 is an enlarged front elevational view of one of the display devices of the present invention illustrating a further bonus component selected by a player.

FIG. 10 illustrates an example game where a player picks a selection 100C that provides a bonus component which includes a set identifier, a bonus identifier "Bonus" and a value "50" associated with it. The set identifier "B" Bonus associates the bonus component with a set. It should be appreciated that a bonus component may be associated with one set, several sets or all of the sets in a game. In FIG. 10, the bonus component is only associated with set 108*b*, and therefore the value of the bonus component is transferred to that set. The bonus component's associated value is fifty and this value is added to the total award for the set in the example illustrated in FIG. 10.

The bonus components add to the total award of a set and increase the awards that a player can win in a game. In some circumstances, the bonus components may make one set more valuable than another set. Since the player's goal is to complete the set with the highest value, the bonus components create larger awards and thereby enhance a player's excitement and enjoyment of the game.

Figure 11:
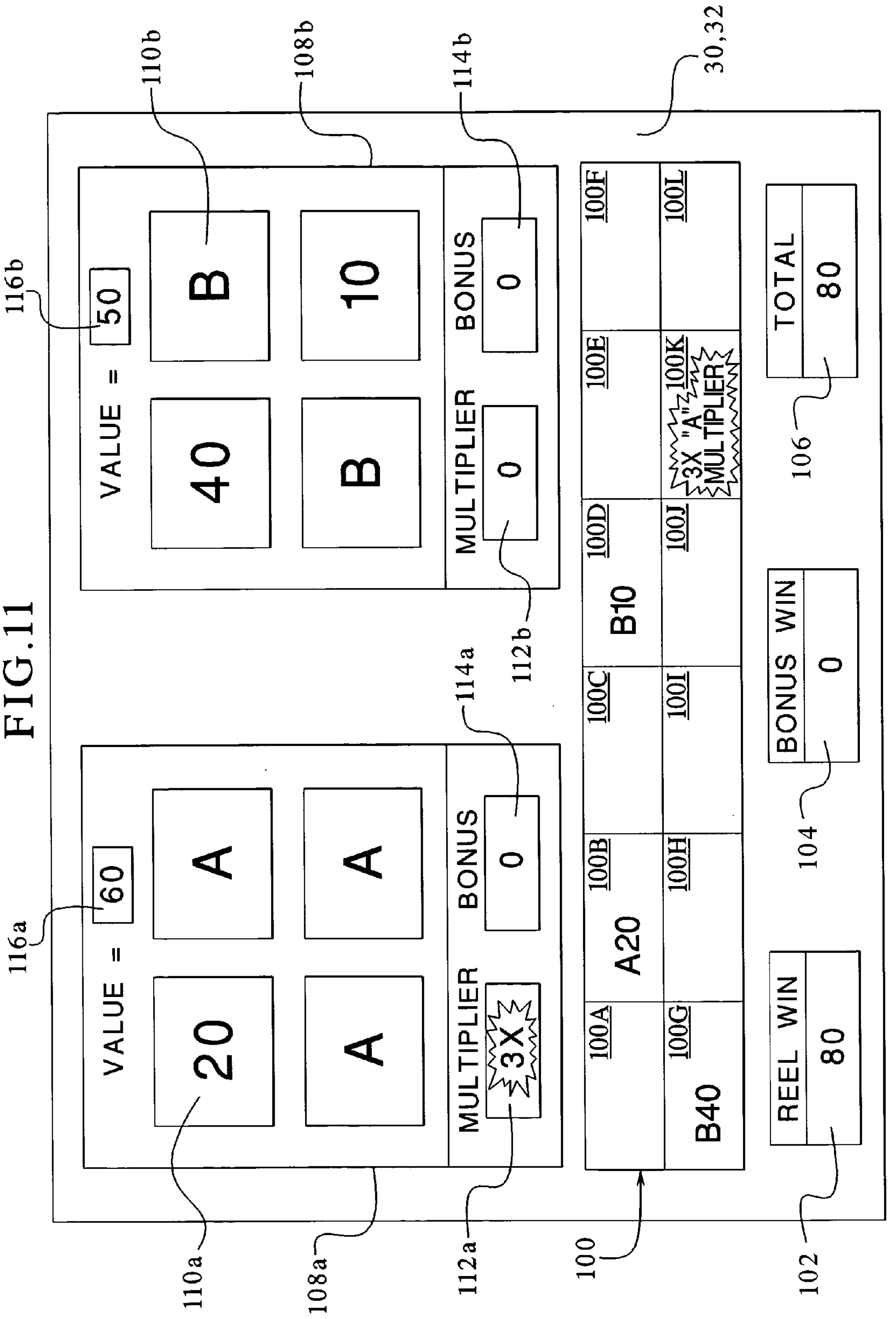
FIG. 11 are enlarged front elevational views of one of the display devices of the present invention illustrating a modifier component selected by a player.

FIG. 11 illustrates another example game where a player picks selection 100K. The selection provides a modifier component which has a set identifier "A" that associates the modifier component with set 108*a*, a modifier identifies "Multiplier" that identifies the type of the selection, and modifier "3×." It should be appreciated that a modifier component may be associated with one set, several sets or all of the sets in a game. In FIG. 11, the modifier component is only associated with set 108*a*, therefore the modifier component is transferred to that set. The modifier component is in this example a multiplier, but may be any other type of modifier that changes the award in a set as discussed above.

The award for set 108*a*, including any bonus components, is modified by the modifier to achieve the award for that set as shown in the set value display 116*a*. In this example, the modifier is a multiplier "3×", which means that the sum of the value components and the bonus components in set 108*a* will be multiplied by three to achieve the award for that set.

The modifier component 112*a* increases the total award for the set and increases the award that a player can win in the game. In some circumstances, the modifier may make one set more valuable than another set. The player's goal is to complete the set with the highest value. Therefore, the modifier component increases the awards received by a player and thereby enhances a player's excitement and enjoyment of the game.

Figure 12:
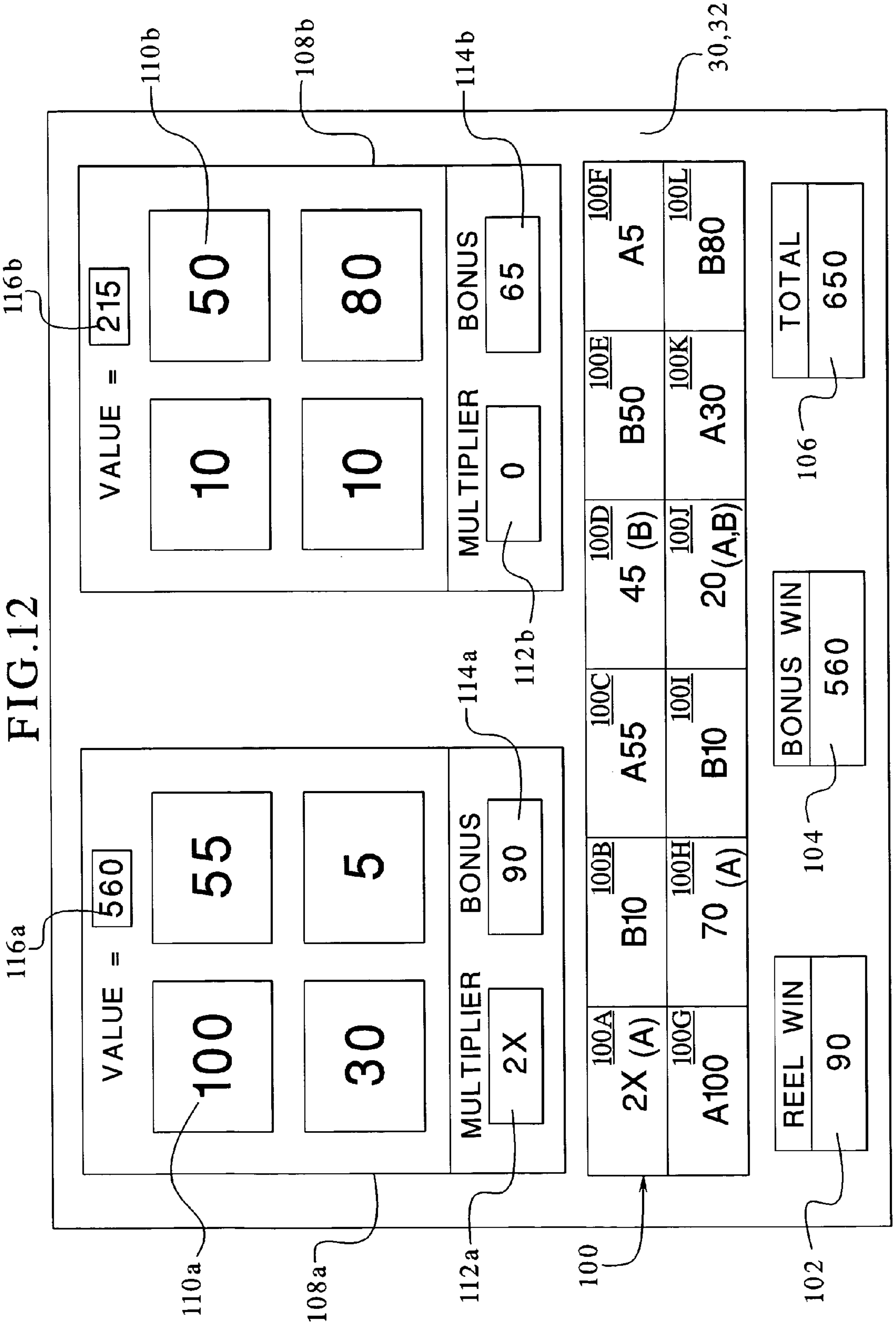
FIG. 12 is an enlarged front elevational view of one of the display devices of the present invention illustrating unmasked components and selections.

FIG. 12 illustrates all of the selections revealed. In this example, the present invention includes twelve selections 100 that provide various components and values. The selections provide value components (such as 100*b*, 100*c*, 100*e*, 100*f*, 100*g*, 100*i*, 100*k* and 100*l*) and preferably four value components for each set. The selections also include three bonus components (such as selections 100*d*, 100*h* and 100*j*) and one modifier component (such as selection 100*a*). It should be appreciated that the selections may have more or less than twelve selections and that the number of value components, bonus components and modifier components vary as desired by an implementor.

Referring now to FIG. 13, an award table 118 illustrates at least a portion of an award database that the present invention may employ to generate an award. The award table 118 includes a plurality of awards 120 having any desired predetermined distribution of values. The awards 120 may include bonuses, modifiers or other items of value such as a number of picks from an award pool (not shown). The present invention includes the game being enabled or not being enabled to randomly select an award 120 a plurality of times.

The present invention also includes adapting the game to randomly generate awards 120 from the award table 118 using one of two methods. In a first award generation embodiment, the game randomly assigns an award to each of the selections 100 (FIG. 3) at the beginning of the game. For example, the game randomly assigns the 10 award to a first selection, the 20 award to a second selection, etc., before the player begins picking selections 100. The game then generates an award depending upon which selection 100 the player picks.

In a second award generation embodiment, the game randomly assigns an award 120 to a pick of an order. That is, the player makes a first pick, a second pick, a third pick, etc. The game randomly assigns, e.g., the 10 award to the first pick, the 20 award to the second pick and so on. The present invention includes the game randomly assigning awards to a plurality or all of the picks before the player begins picking selections 100 or alternatively assigning each award directly to a selection 100 after the player picks a selection.

In FIG. 13, the award table 118 illustrates at least a portion of an award database that the present invention employs to generate an award. The awards 120 each include an associated likelihood percentage 122 that the processor 38 (see FIG. 2) utilizes to select a particular award. The game contemplates probabilities or likelihood percentages 122 having any desired distribution, wherein the percentages preferably add to 100%. For example in award table 118, the game is twice as likely to select one of the 15, 20, or 25 awards as it is to select either the 10, 30 or 35 awards.

Similarly, the award table 118 may be employed for each component in a game, including the bonus and modifier components. It should be appreciated that the award tables may employ the same awards or different awards, as well as have the same award likelihood percentages or different award likelihood percentages. Therefore, each award table 118 may have different award values 120 and different award distribution percentages 122.

FIG. 14 illustrates another example of how the game may randomly distribute components within the game based on likelihood percentages. The component distribution table 124 is employed by the processor 38 to distribute components to a particular set or sets based on probabilities or likelihood percentages 126. The component distribution table 124 includes as many set locations 128 as there are sets 108 in a game. The set locations 128 each include an associated likelihood percentage 126 that the processor 38 (see FIG. 2) utilizes to select the particular set location. The game contemplates probabilities or likelihood percentages 126 having any desired distribution, wherein the percentages preferably add to 100%. In this example, a component such as a modifier component is twice as likely to be assigned to set A or set B as it is to both sets A and B. It should be appreciated that a game may employ the same likelihood percentages 126 or each component may have its own component distribution table 124 with likelihood percentages 126.

Preferred Multiple Potential Award Game Embodiment

Referring again to FIG. 12, one preferred embodiment of a multiple potential award game is illustrated fully revealed or unmasked on a display device 30 or 32 to show each of its game outcomes. The preferred multiple potential award game includes at least two sets having one or more value components per set, at least one modifier component, at least one bonus component and a plurality of selections 100.

The preferred multiple potential award game requires the player to pick selections until a set is complete. Any player pick of the selections may generate a value component, multiplier component or a bonus component. Each player pick preferably adds value to the award for a set or both sets. It should be appreciated that alternatively, a selection may not affect a set, may reduce the value of a set, or may change one of the components of a set. Once a player completes a set, the player receives the award associated with that set. Alternatively, the player may receive the value of the last set completed, the value of an intermediate set completed, or some award associated with a completed or uncompleted set. The award is added to any awards that a player received from a previous game or games and a new award total is calculated for the player.

Figure 15:
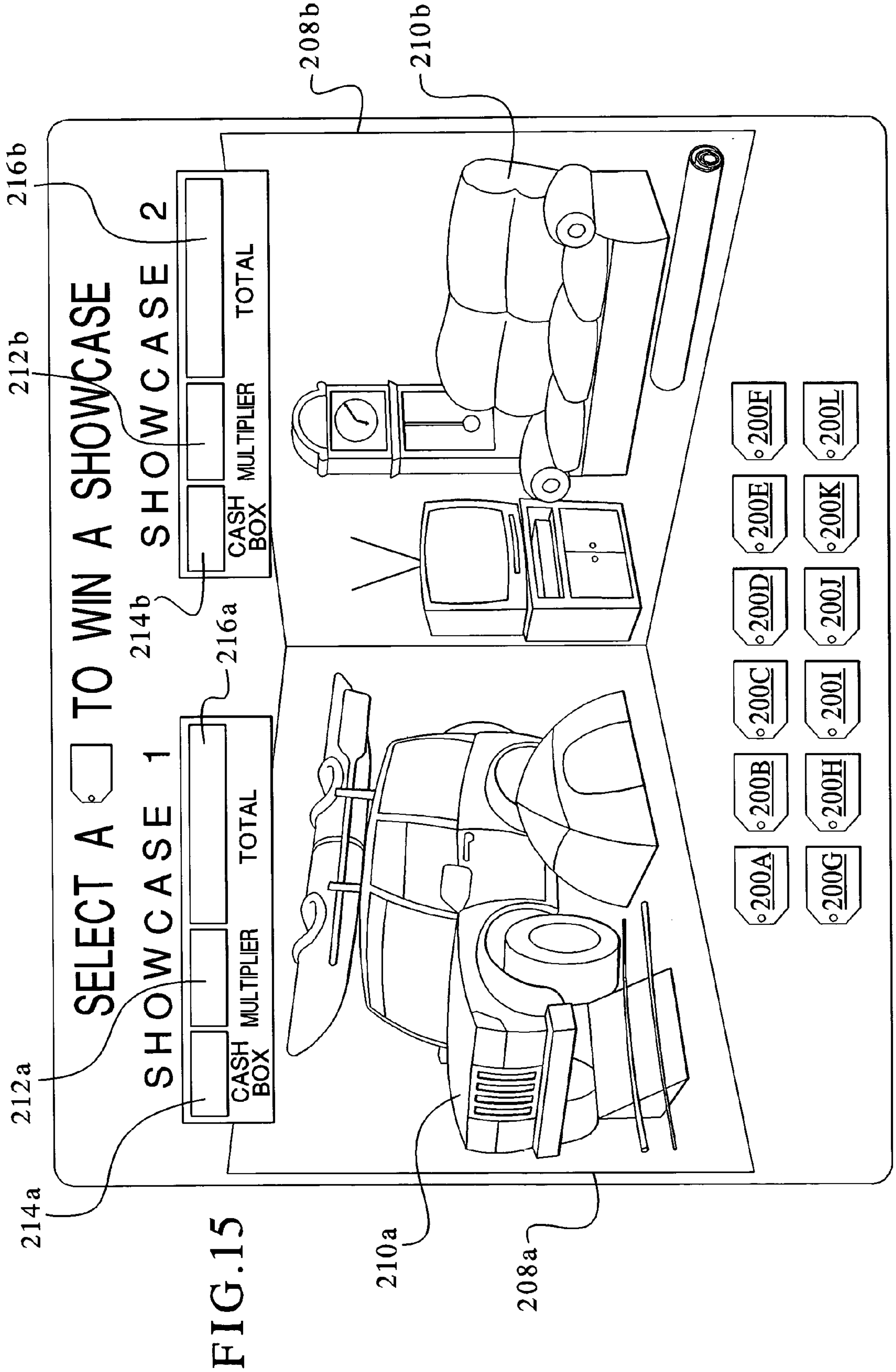
FIG. 15 is an enlarged front elevational view of one of the display devices of the present invention illustrating an embodiment of the invention where the value components are different objects which represent values.

FIG. 15 shows a further embodiment of the present invention where the potential award sets 208*a* and 208*b* include value components such as 210*a* or 210*b*, that are objects or items which represent a value. Alternatively, the object could be prizes awarded to the player which is the item itself. In this embodiment, a player picks one of the selections, 200A to 200L. The player's selection reveals an item associated with one set or more than one set. Each item is associated with a value, which is transferred to the associated value component, 210*a* or 210*b*, for each set. The player completes a set or sets by picking all the value components 210*a* or 210*b* for the set.

Once a set is completed, the player receives the total value for that set associated with the items in the set.

The total value of a set is based on the bonuses, modifiers and value components picked by the player for that set. The bonus values, if selected, are displayed in the bonus value components 214*a* and 214*b* for each set. Similarly, modifier values such as multipliers, are shown in the modifier components 212*a* and 212*b* for each set. The total value of a set is determined by adding the value components and any bonus values selected by a player. This sum is then modified by any modifier values selected by the player and the resultant total is displayed in the set value components 216*a* and 216*b* for each set.

In FIG. 15, the first set 208*a* includes items associated with an outdoor theme illustrated by the truck, tent, canoe and fishing poles. The second set 208*b* includes items associated with a household theme illustrated by the couch, television, rug and clock. A player picks a selection 200A to 200L. Subsequently, the picked selection reveals a value component from either set 208*a* or 208*b*. It is contemplated that a selection may reveal a value component associated with more than one set. If the player's selection reveals the truck, a value associated with the truck is transferred to the value component 210*a*. If the selection reveals the couch, a value associated with the couch is transferred to the set value component 210*b*. The picked selections may also reveal bonuses and modifiers that add to the potential award for a set.

A player completes a set by selecting each value component within a particular set. For example, if a player picked selections 200 such that they revealed the truck, tent, canoe and fishing poles, the player completes set 208*a*. The total value of the components is added to the bonus values picked by a player and then modified by the modifier value, if any, shown in the modifier components 212*a* 212*b* to achieve the total value of the set as displayed in the set value component 216*a* and 216*b*. The set value component is the total award that the player receives for completing that set.

Figure 16:
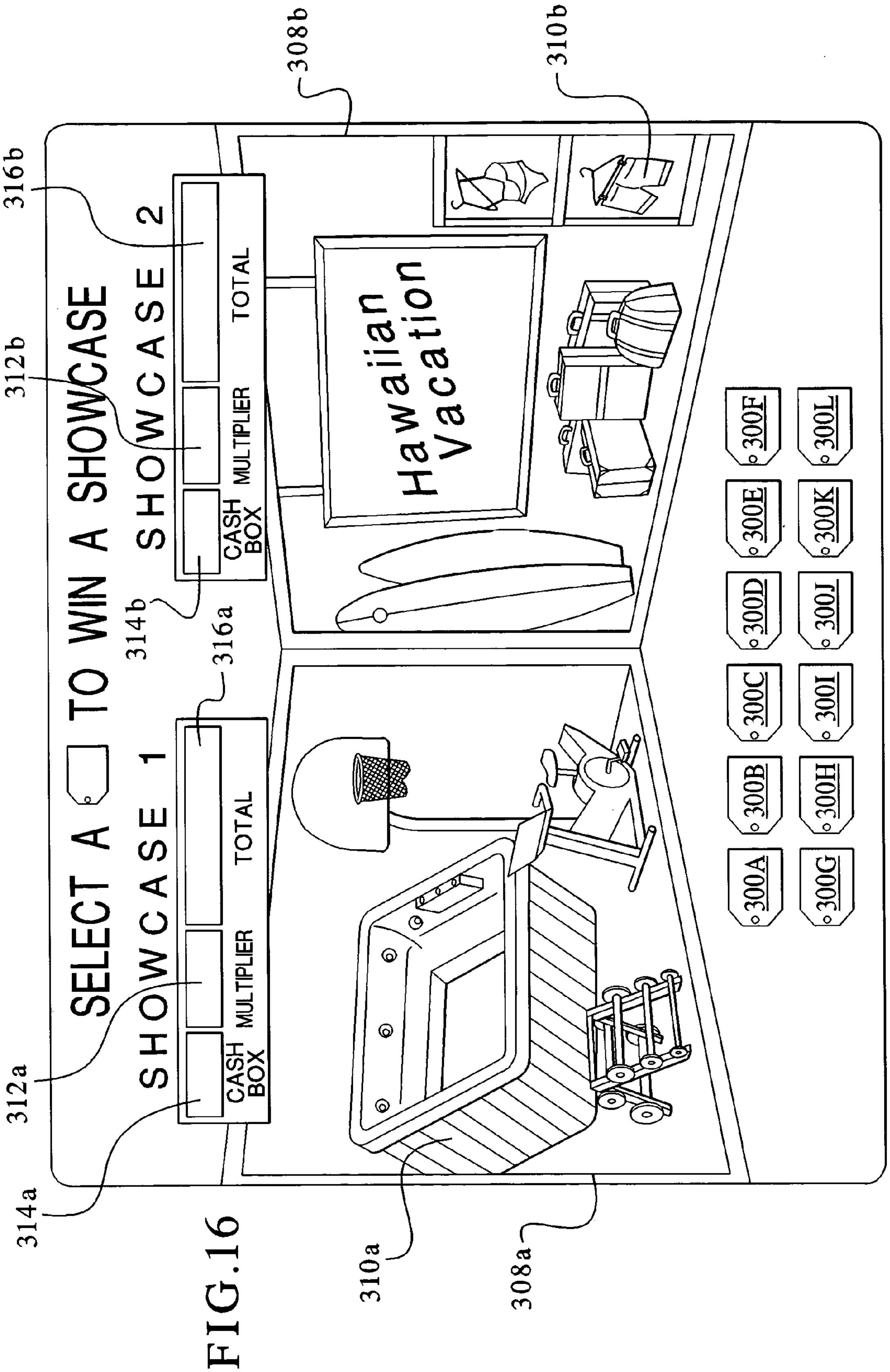
FIG. 16 is an enlarged front elevational view of one of the display devices of the present invention illustrating another embodiment of the invention where the value components are different objects which represent values.

FIG. 16 illustrates another embodiment where the value components of set 310*a* are recreational items such as a hot tub, basketball hoop, exercise bike and dumbbells. In set 310*b*, the value components are associated with a trip or vacation and include a Hawaiian vacation, surfboards, luggage and bathing suits.

A player picks the selections 300 until the player completes one of the sets 310*a* or 310*b*. For example, a player may pick selections 300 and reveal the hot tub, basketball hoop, exercise bike and dumbbells. If the player picks these value components before picking all of the value components in set 308*b*, then the player receives the total value of the recreational set 308*a*.

The value of the recreational set 308*a* is the total value of the components of that set. Each component, the hot tub, basketball hoop, exercise bike and dumbbells, are associated with a value. When that component is selected, the component value is transferred to the set value component 310*a* and/or 310*b*. Once the set is completed, the set value component 310*a* or 310*b* is modified by the modifier value, if any, in 312*a* and 312*b*. The total value is then displayed in the set value component 316*a* and 316*b*. The total value shown in the set value component is the award that the player receives for completing that set.

Similarly, if the player completed set 308*b* first by selecting the couch, television, rug and clock, the player receives the award shown in the total value component 316*b*. The total value component is the sum of the value components 310*b* plus any bonus values shown in 312*b*, and then modified by any modifiers selected in the game.

Accumulation Game and Multiple Independent Terminating Conditions

In one embodiment of the present invention, the gaming device displays a plurality of symbol generators or symbol indicators to a player. Each of the symbol generators or symbol indicators is associated with a symbol set having a plurality of symbols. The symbol sets may include the same symbols or may include one or more different symbols. One, some or all of the symbols in each set are associated with an outcome, such as a value. In one embodiment, each symbol has a probability of being indicated or generated. The probability for each symbol may be the same or different.

Upon activation of the symbol generators or symbol indicators, for each symbol generator or symbol indicator, the gaming device determines or calculates which symbol to indicate based on the different probabilities associated with each of the symbols associated with that symbol generator or symbol indicator. Each symbol generator or symbol indicator indicates or generates the determined symbol. In one embodiment, the gaming device marks or flags the indicated symbols for the game.

In one embodiment, each of the symbol sets is associated with a designated number of symbols. The designated number of symbols may include a number or may be a group of designated symbols in the symbol set. The gaming device continues to activate the symbol generators or symbol indicators in the game until a designated number or all of the symbols in a symbol set associated with at least one of the symbol generators or symbol indicators have been indicated, marked or flagged in the game. In one embodiment, after all of the designated numbers or all of the symbols in at least one symbol set have been marked or generated, the gaming device provides an award to the player.

Figure 17:
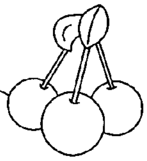
FIG. 17 is a chart illustrating a set of symbols and their associated values and probabilities.
Figure 17:
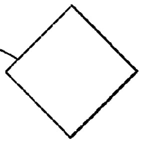
Figure 17:
Figure 17:
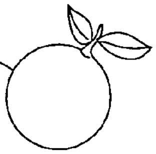
Figure 17:
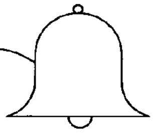

More specifically, referring now to FIG. 17, in one embodiment of the present invention each symbol 402*a*, 402*b*, 402*c*, 402*d* and 402*e* or indicia in one of the symbol sets is associated with a value 404*a*, 404*b*, 404*c*, 404*d* and 404*e* and a probability 406*a*, 406*b*, 406*c*, 406*d* and 406*e*, respectively. In one example embodiment, one of the symbols is a cherry symbol 402*a*, in the table 400 in the first column 402. The cherry symbol has a value of 10 404*a* and has 20% probability of being indicated on the reel 406*a*. The second symbol on the reel is a diamond symbol 402*b*, which has a value of 5 404*b* and has a 50% probability of being indicated 406*b*. The heart symbol 402*c* has a value of 25 404*c* and has a 5% probability of being indicated 406*c*. The orange symbol 402*d* has value of 20 104*d* and has a 10% probability of being indicated 406*d*. The bell symbol 402*e* has a value of 10 and a 15% probability of being indicated 406*e*. In this embodiment, each of the symbol sets is associated with a plurality of symbols. Each symbol set includes the same symbols and different symbols than the other symbol sets. The symbol sets include different symbols and thus are associated with different payables. The symbol set illustrated in FIG. 17 is associated with the first reel. A plurality of other paytables (not illustrated) are associated with the other reels. However, it should be appreciated that one or more symbol sets or symbol generators may include the same symbols and thus may be associated with the same values and/or probabilities.

Figure 18A:
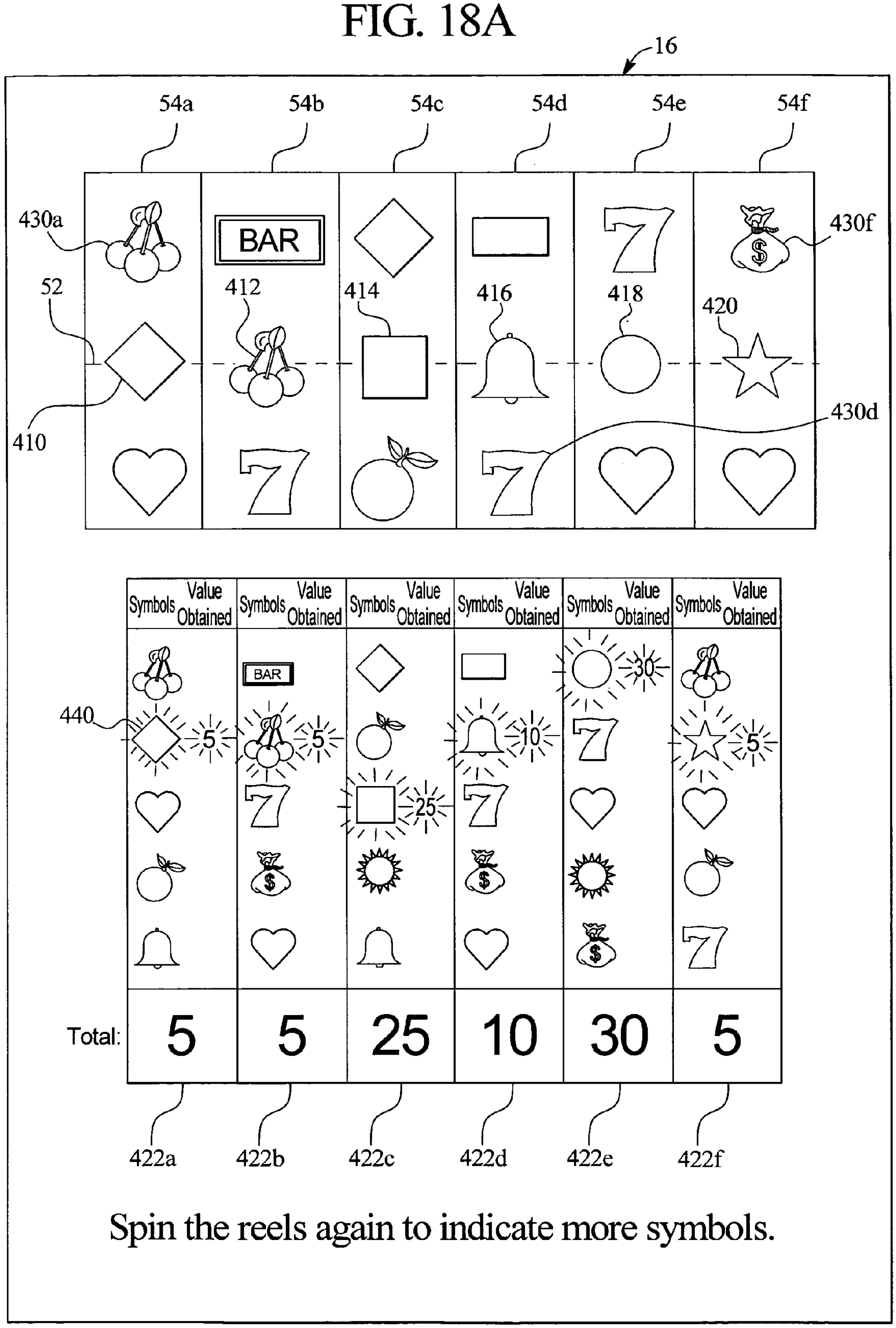
FIGS. 18A, 18B, 18C, 18D and 18E are front views of an example of one embodiment of the present invention illustrating accumulation meters and the multiple, independent terminating conditions.

As illustrated in FIG. 18A, in one embodiment of the present invention, the symbol generators are reels. In one embodiment, the gaming device includes six reels on the gaming device 54*a*, 54*b*, 54*c*, 54*d*, 54*e* and 54*f*. It should be appreciated that any suitable plurality of mechanical or virtual reels could be used in the present invention. In one embodiment, the gaming device initiates the spinning of the reels. In an alternative embodiment, the gaming device enables the player to activate or spin the reels. In one embodiment, all of the reels begin spinning at the same time. In another embodiment, the reels start spinning sequentially. The reels may stop spinning simultaneously or sequentially. In one embodiment, at least one but not all of the reels generate symbols. At least one payline 52 is associated with the reels.

The processor determines or calculates which symbol to indicate on each of the reels based on the probabilities of the symbols of that reel. When the reels stop spinning, each reel indicates a symbol based on the corresponding symbol determination. For example, on the first reel 54*a* in FIG. 18A, the diamond symbol 410 is indicated on the payline 52. The processor marks or flags the symbol after it is generated as indicated in the symbol accumulation meter at the bottom of FIG. 18A. As illustrated in the chart 400 of FIG. 17, the diamond symbol has a value of five 404*b* and has a 50% probability of being indicated 406*b*. In one embodiment, the symbols have the same probability of being indicated. In another embodiment, the symbols have a different probability of being indicated.

In one embodiment, each symbol generator is associated with an accumulation meter 422*a*, 422*b*, 422*c*, 422*d* 422*e* and 422*f*, which displays the value of the indicated symbol. For example, the first reel 54*a* indicates the diamond symbol 410 in FIG. 18A and the accumulation meter 422*a* associated with the first reel 54*a* displays a 5 next to the diamond symbol 440 on the accumulation meter to indicate the value of the symbol to the player. The game terminates when a designated number or each of the symbols in at least one symbol set have been indicated.

In one embodiment, each accumulation meter also includes a value indicator. In this embodiment, each value indicator is located at the bottom of each accumulation meter. The value indicator displays the total value of the indicated or generated symbols for that reel. On the first reel 54*a*, the value indicator on the accumulation meter displays a value of 5, the value of the indicated diamond symbol.

The second reel 54*b* indicates a cherry 412 on the payline 52. The cherry symbol has a value of 5, which is displayed in the corresponding accumulation meter 422*b*. In this embodiment, the same symbols for each reel may be associated with different for values. For example, the cherry symbol is associated with a value of ten for the first reel and a value of five for the second reel. It should be appreciated that the same symbols may be associated with the same or different values for different reels. The third reel 54*c* indicates a square symbol 414 which has a value of 25. The associated accumulation meter 422*c* displays the value 25 next to the square symbol on the accumulation meter. The fourth reel 54*d* indicates a bell symbol 416, and the associated accumulation meter 422*d* displays the value of 10 next to the bell symbol. The fifth reel 54*e* indicates a circle symbol 418 on the payline. The associated accumulation meter 422*e* displays a value of 30 next to the circle symbol. The final reel, 54*f*, indicates a star symbol. The associated accumulation meter 422*f* displays the value of 5 next to the star symbol 420. In this embodiment, the designated number for each of the symbol sets are all of the symbols for that set. That is, all of the symbols of one of the symbol sets have not been indicated, so the reels spin again to produce another generation of symbols.

Figure 18B:
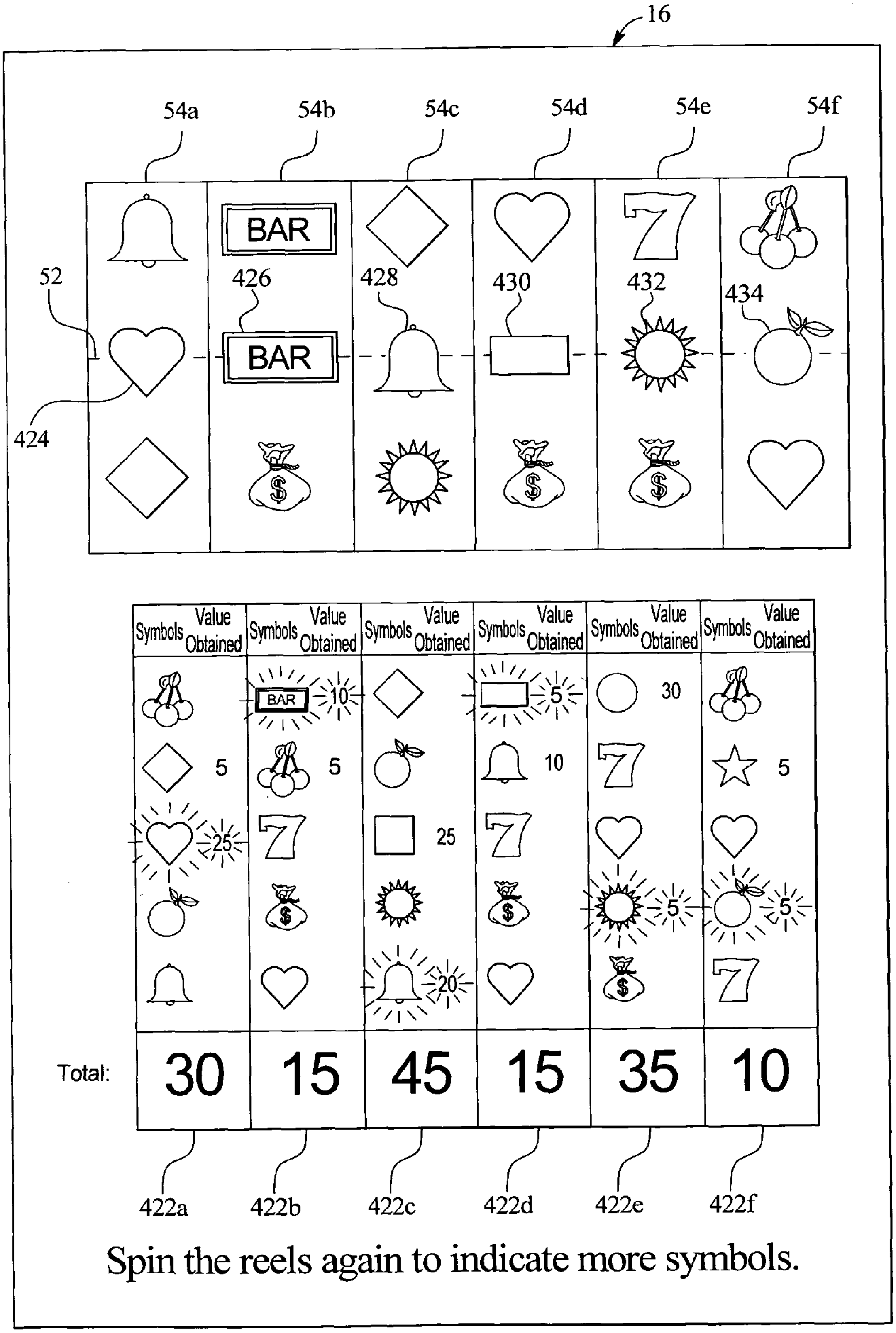

When the reels stop spinning, new symbols are indicated as illustrated in FIG. 18B. The first reel 54*a* indicates a heart symbol 424. The heart symbol has a value of 25 and a 5% probability of being indicated as illustrated in FIG. 17. In FIG. 18B, the associated accumulation meter 422*a* displays the value 25 next to the heart symbol and the value of 5 next to the diamond symbol, from the prior spin. The value of 30 has been obtained on the first reel on the first spin for this game. The corresponding accumulation meter 422*a* displays a value of 30 in the value indicator, 5 for the diamond symbol and 25 for the heart symbol. The second reel 54*b* indicates the bar symbol 426 and the associated accumulation meter 422*b* displays a 10 next to the bar symbol. The accumulation meter also displays a 5 next to the cherry symbol from the prior round. The value of 15 has been obtained for the second reel and the corresponding accumulation meter 422*b* displays a value of 15 in the value indicator. The third reel 54*c* indicates a bell symbol 428. The accumulation meter 422*c* displays a 20 next to the bell symbol, a 25 next to the square symbol from the prior round and 45 in the value indicator. The fourth reel 54*d* indicates a rectangle symbol 430. The corresponding accumulation meter 422*d* displays a 5 next to the rectangle symbol, a 10 next to the bell symbol from the prior round and a 15 in the value indicator. The fifth reel 54*e* indicates a sun symbol 432. The corresponding accumulation meter 422*e* displays a 5 next to the sun symbol, a 30 next to the circle symbol from the prior round, and a 35 in the value indicator. The final reel 54*f* indicates an orange symbol 434. The corresponding accumulation meter displays a 5 next to the orange symbol, a 5 next to the star symbol from the prior round, and a 10 in the value indicator. All of the symbols on one of the reels have not been indicated, so the game continues into another generation or round.

Figure 18C:
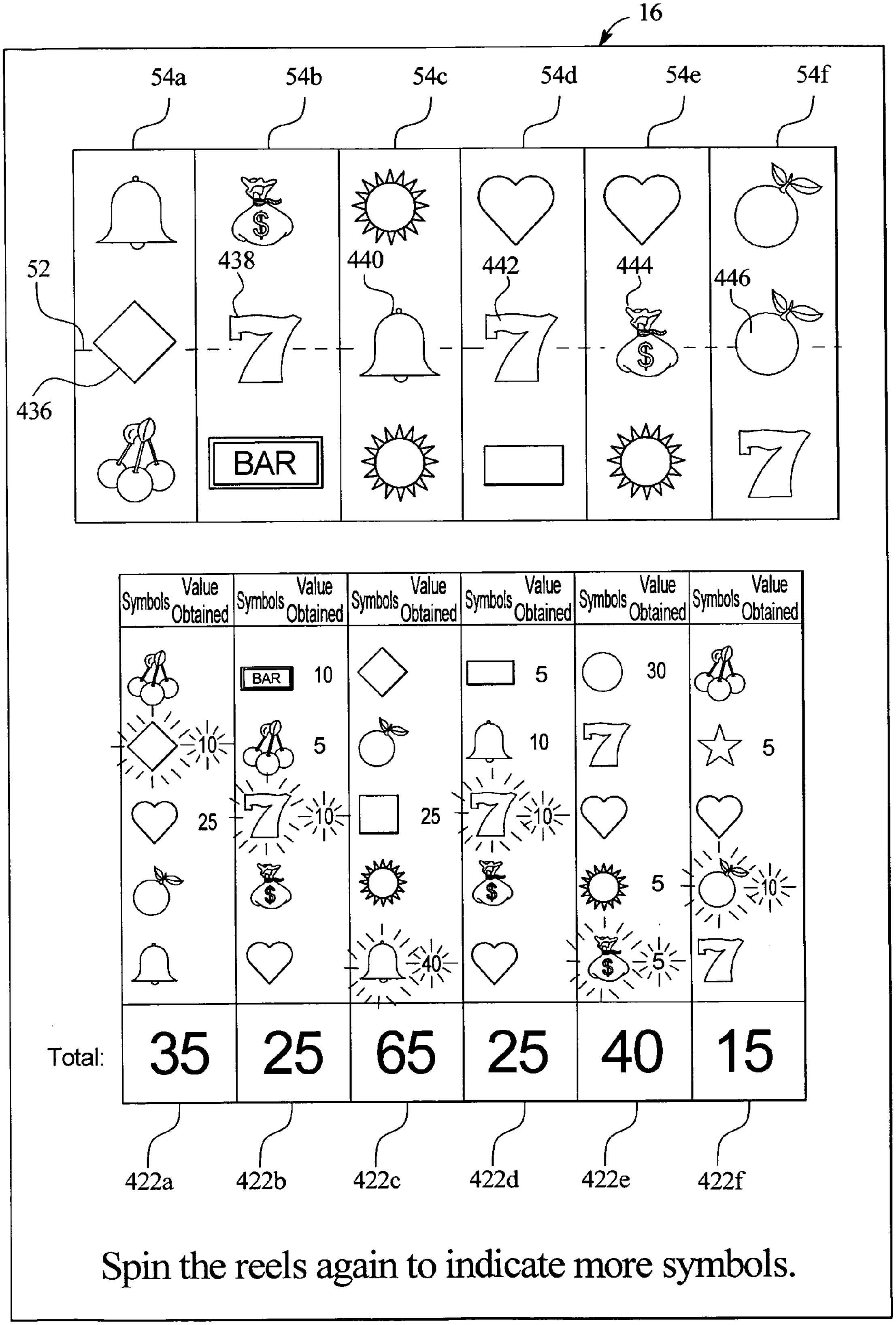

The reels spin again, indicating symbols as illustrated in FIG. 18C. In FIG. 18C, the first reel 54*a* indicates a diamond symbol 436. The associated accumulation meter 422*a* displays a value of 10 next to the diamond symbol. As illustrated in FIG. 18A, a diamond symbol 410 was indicated on the first reel in the first generation. In one embodiment of the present invention, when a symbol has been indicated more than once on the same reel, the gaming device adds the value of the award to the accumulated award value in the value indicator and next to the symbol in the accumulation meter for that reel. For example, the corresponding accumulation meter 422*a* displays a value of 10 is next to the diamond symbol and in the value indicator, 5 for the current round and 5 from the first round. That is, the player continues to accumulate values without a terminating effect.

Three of the other five reels 54*b*, 54*d*, and 54*e*, indicate a different symbol than was indicated in the previous round. The value of each indicated symbol is displayed in the corresponding accumulation meter and the value is added to the total in the value indicator. Two of the reels 54*c* and 54*f* each indicate a symbol that was already indicated for that reel in the prior round. The third reel 54*c* indicated a bell symbol 440 again. The associated accumulation meter 433*c* displays a value of 20 next to the bell symbol. As indicated in FIG. 18B, a bell symbol 428 was indicated on the third reel in the second generation. The bell symbol is repeated and in this embodiment, the value associated with the bell symbol is added to the total in the value indicator. In reel 54*f*, an orange symbol 146 was indicated again or repeated. Likewise, the value of the orange is added to the total value for that reel.

Figure 18D:
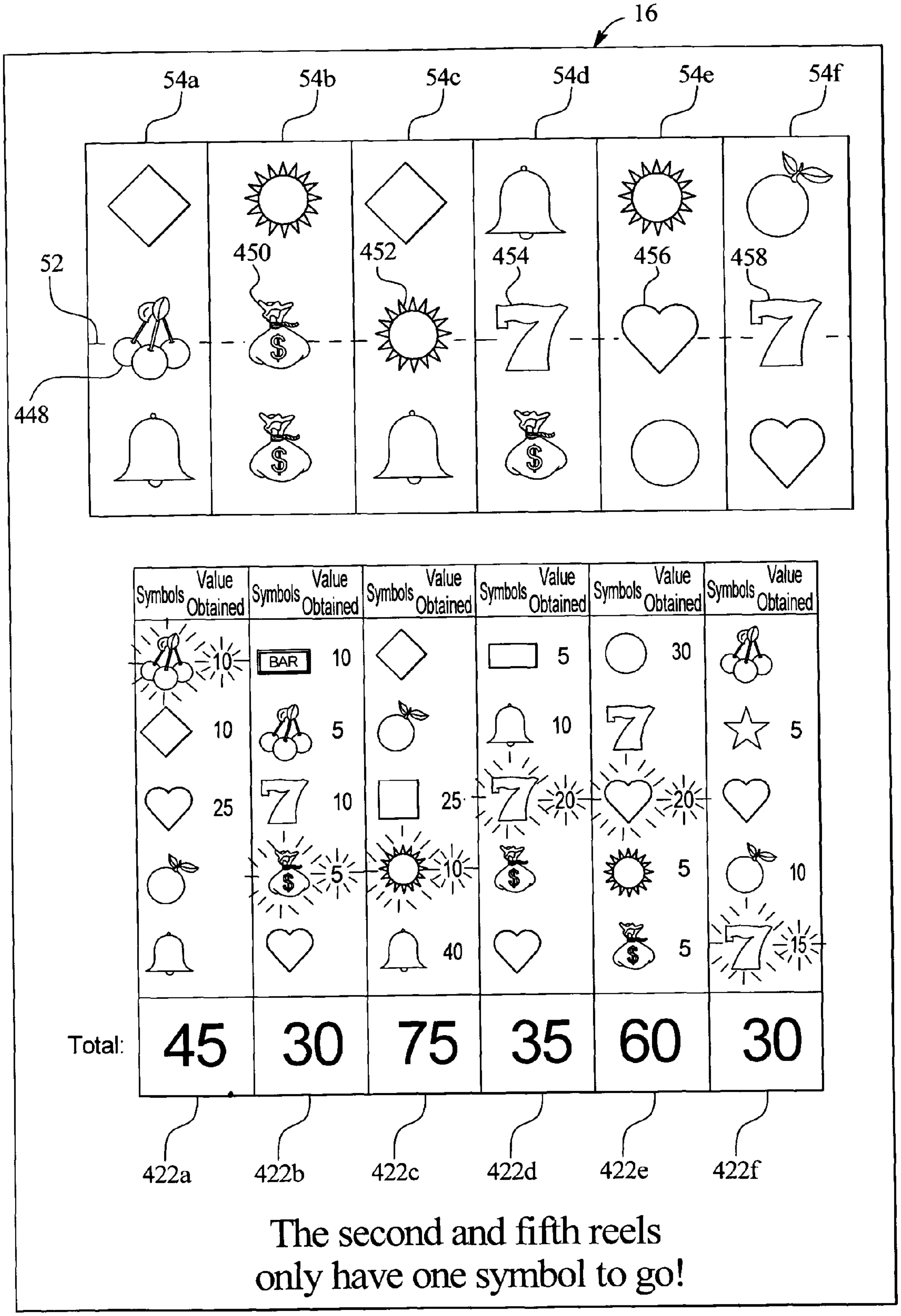

All of the symbols on one of the reels have not been indicated and the game continues into another generation. The game continues until all of the symbols have been indicated in at least one of the symbol groups or symbol sets. The reels are spun again and new symbols are indicated, as illustrated in FIG. 18D. The value associated with each indicated symbol is displayed in each corresponding accumulation meter. These values are added in the value indicator for each accumulation meter. The reels 54*a* to 54*f* indicate a cherry symbol 448, a money symbol 450, a sun symbol 452, a seven symbol 454, a heart symbol 456 and a seven symbol 458 respectively. The first, third, fourth and sixth reel each have indicated three of the five symbols necessary to complete the symbol groups. The second and the fifth reels each have four symbols indicated. If either the second or the fifth reel indicate the remaining symbol in their associated symbol groups, the game ends.

Figure 18E:
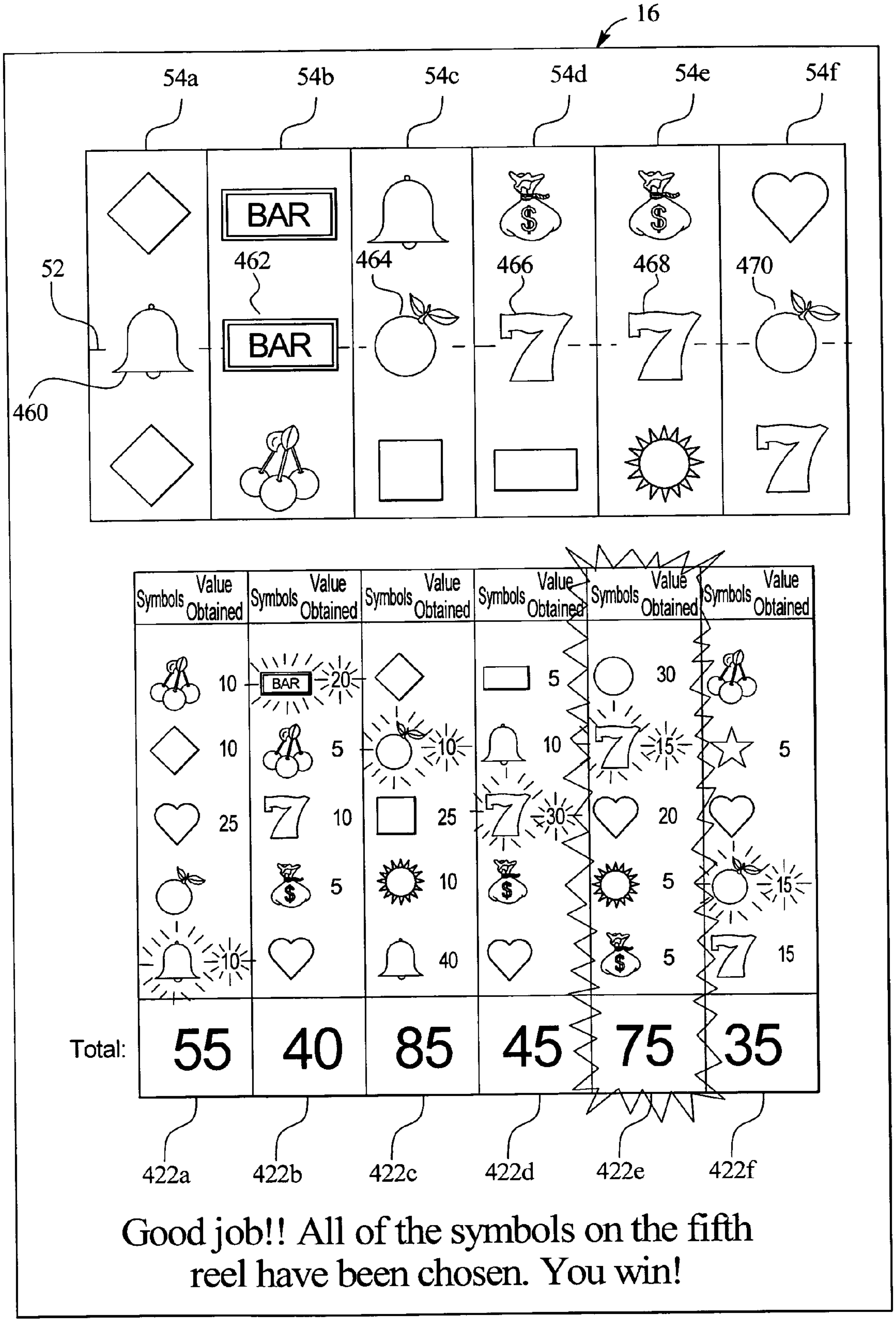

In one embodiment of the present invention, the game terminates when all of the symbols have been indicated in one symbol group associated with one of the reels as illustrated in FIG. 18E. The fifth reel indicates a seven symbol, the final symbol in its symbol group. The fifth reel 54*e* indicated all of the symbols in its symbol group: a circle, a sun, money, a heart and a seven. Because the fifth reel was the first reel to indicate each symbol in the associated symbol group, the game ends and the player receives an award. In one embodiment, the player receives the accumulated value for that reel which is displayed in the value indicator. In this case, the accumulation meter 422*e* displays 75 in the value indicator, which is the sum of all of the symbol values obtained in the game for that reel.

In one embodiment, each of the symbol sets includes at least one same symbol as the other symbol sets and the same symbol is associated with the same value for each symbol set. It should be appreciated that the symbol sets may include one or more different symbols. In another embodiment, each of the symbol generators includes at least one same symbol and the same symbol is associated with a different value for each symbol group or each symbol generator.

Figure 19A:
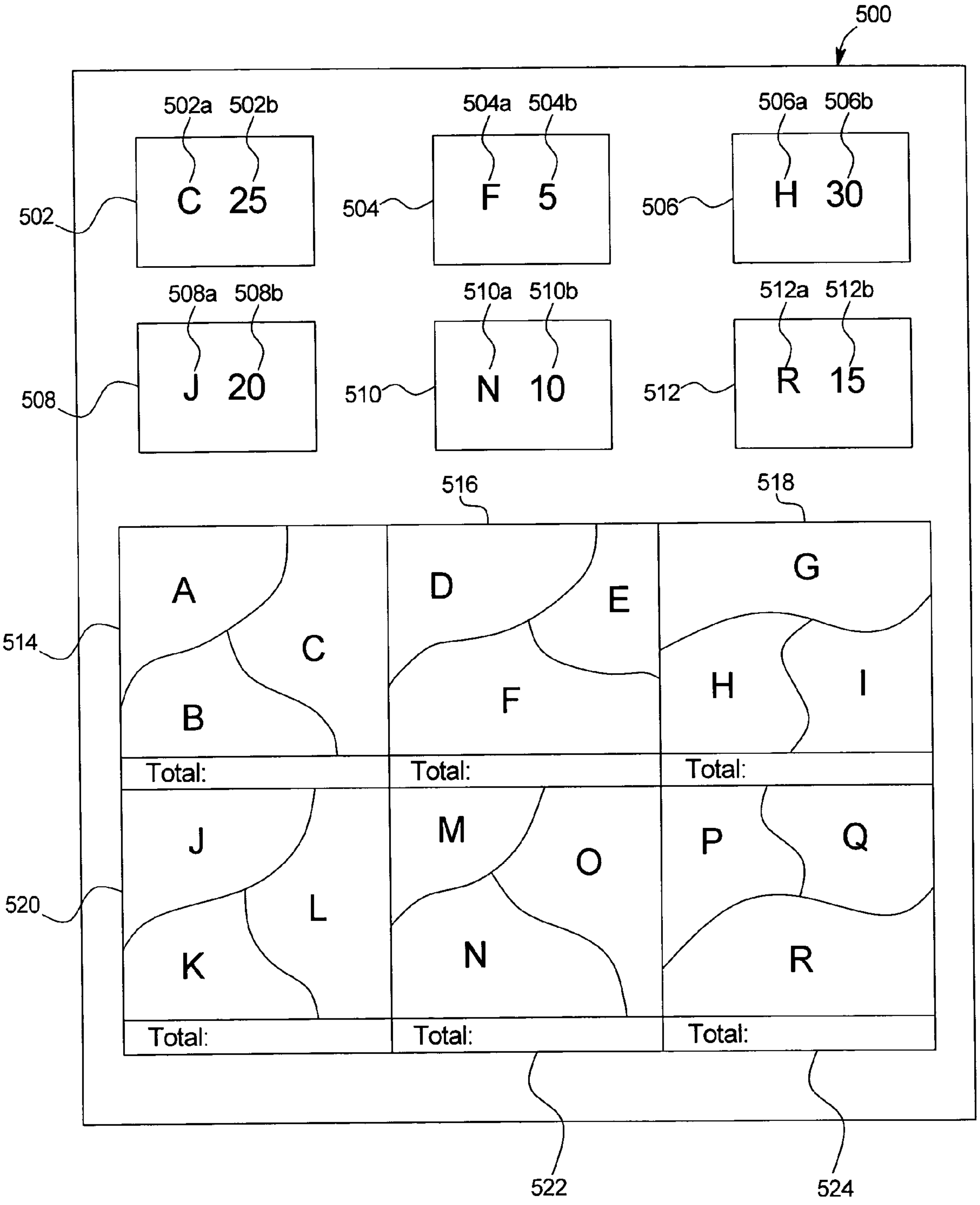
FIGS. 19A, 19B, 19C and 19D are front views of an example of one embodiment of the present invention illustrating accumulation meters and multiple, independent terminating conditions.

As illustrated in FIG. 19A, in another embodiment of the present invention, the symbol generators are individually situated reels. In one embodiment, each symbol generator is associated with a symbol set or group of symbols. As illustrated in FIG. 19A, the gaming device includes six reels on the gaming device, 502, 504, 506, 508, 510, and 512. In one embodiment, all of the reels begin spinning at the same time. In another embodiment, the reels start spinning sequentially. The reels may stop spinning simultaneously or sequentially. In one embodiment, one but not all of the reels spin or generate symbols. At least one payline is associated with each reel (not illustrated).

The processor determines or calculates which symbol to generate on each of the reels based on the probabilities of the symbols of that reel and marks off each generated symbol, as previously discussed. When the reels stop spinning, each reel generates a symbol based on the corresponding symbol determination. For example, the first reel 502 indicates the C symbol 502*a* which has a value of 25 502*b*.

Figure 19B:
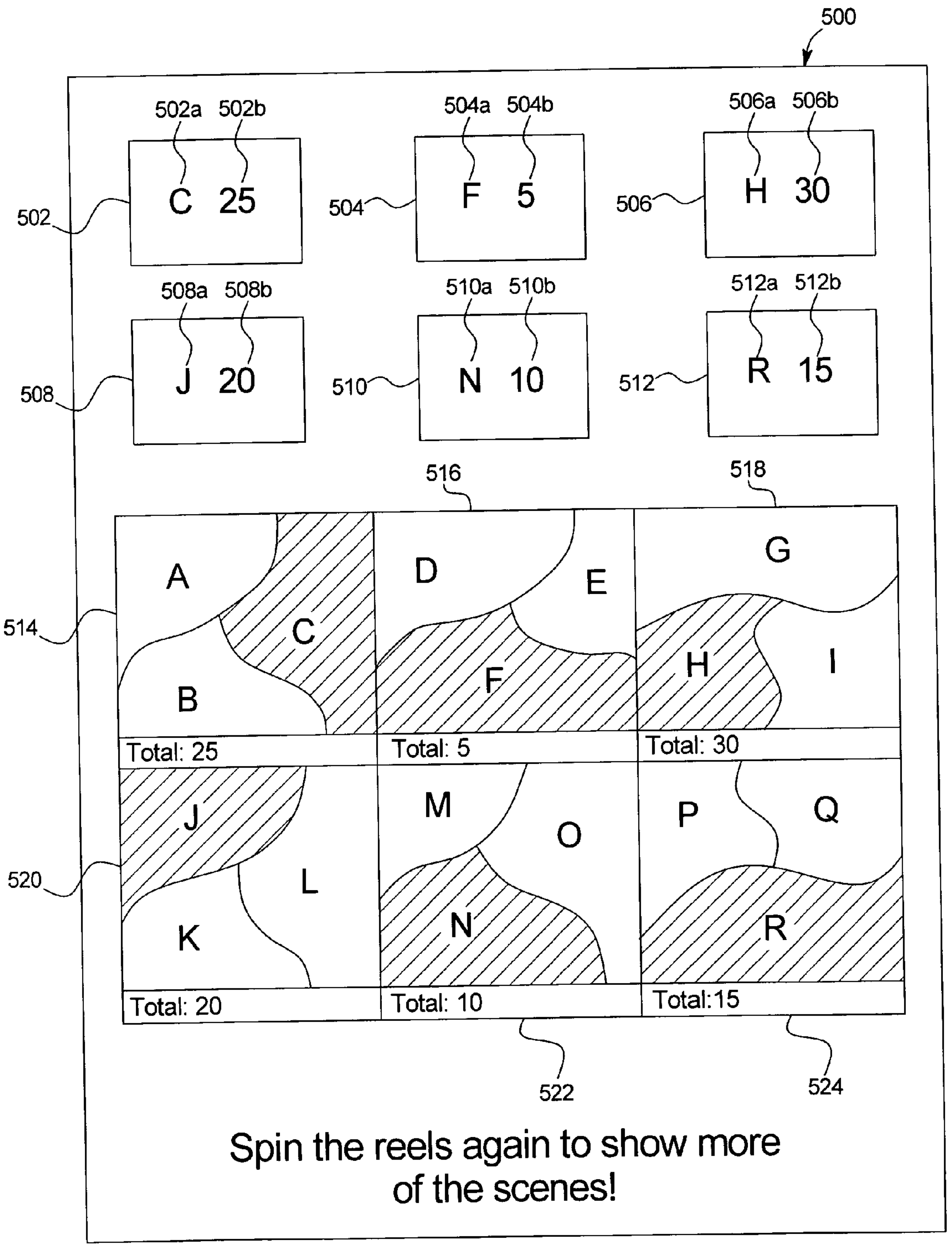

In one embodiment, each symbol generator is respectively associated with an accumulation meter 514, 516, 518, 520, 522, and 524. In one embodiment, the symbols on the reels are portions or regions of a scene or a picture. When a symbol is generated on a reel, the portion or region associated with the generated symbol is highlighted, marked or indicated on the corresponding accumulation meter. For example, the first reel 502 generates a C symbol 502*a* in FIG. 19B and the corresponding accumulation meter 514 highlights, indicates or marks the C region of the picture or scene. The game terminates when a certain number or all of the symbols in at least one symbol set have been indicated. That is, the game terminates when an entire scene has been indicated, marked or highlighted on at least one of the accumulation meters.

In one embodiment, each accumulation meter also includes a value indicator. The value indicator displays the total value of the generated symbols for that reel. For example, the first reel 502 generates a C symbol 502*a* with a value of 25 502*b*. The associated accumulation meter 514 includes a value indicator which displays a value of 25.

The second reel 504 generates an F symbol 504*a*. The F symbol has a value of 5 504*b*, which is displayed next to the F symbol. The gaming device highlights the F region on the associated accumulation meter 516 and displays a value of 5 in the value indicator. The third reel 506 generates an H symbol 506*a* with a value of 30 506*b*. The gaming device highlights the H region of the scene of the corresponding accumulation meter 518 and displays a value of 30 in the value indicator. The fourth reel 508 generates a J symbol 508*a* which has a value of 20 508*b*. The J region of the scene on the corresponding accumulation meter is highlighted and a value of 20 is displayed in the value indicator. The fifth reel 510 generates an N symbol 510*a* with a value of 10 510*b*. The N region of the corresponding accumulation meter is highlighted and a 10 is displayed in the value indicator. The final reel 512 generates an R symbol 512*a* with a value of 15 512*b*. The gaming device highlights the R region of the corresponding accumulation meter 524 and displays a value of 15 in the value indicator. A designated number or all of the symbols of at least one symbol set have not been indicated, so the reels spin again to produce another generation of symbols.

Figure 19C:
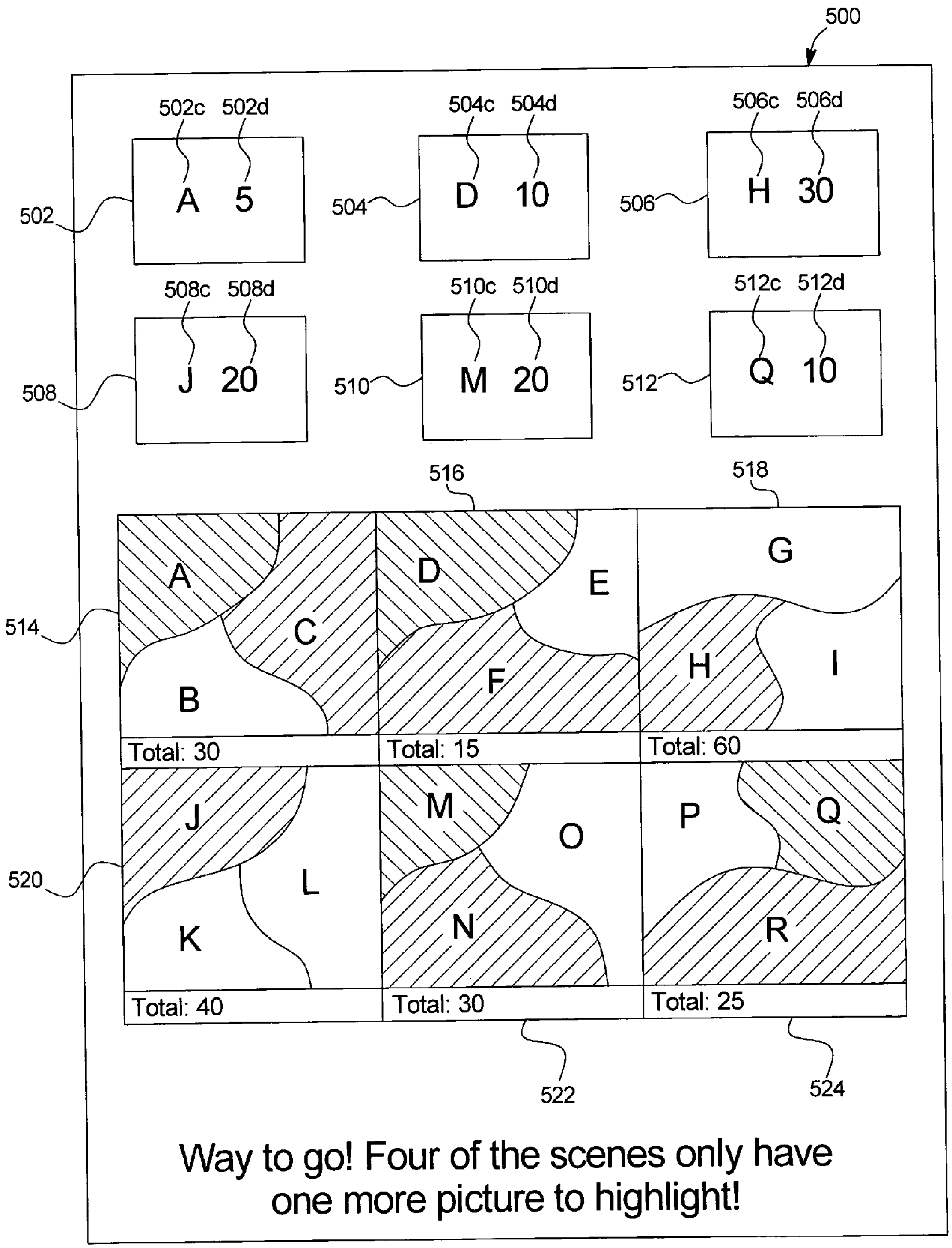

When the reels stop spinning, new symbols are generated as illustrated in FIG. 19C. The first reel 502 generates an A symbol 502*c* with a value of 5 502*d*. The gaming device highlights the A region of the associated accumulation meter 514 and displays a 15 in the value indicator, the sum of the 5 obtained from the previous spin of the reels and the 10 obtained from the current spin. The second reel 504 generates a D symbol 504*c* with a value of 10 504*d*. The value indicator of the accumulation meter now displays a total of 30, the sum of the 25 obtained from the generation and the 5 that was obtained this generation. The third reel 506 generates an H symbol 506*c* with a value of 30 506*d*. The third reel generated an H symbol in the previous spin of the reels. The symbol H has been repeated for the third reel 506. In one embodiment, the value of the repeated H symbol, in this case 30, is added to the total accumulated value for the reel. The total value of 60 is displayed in the value indicator of the associated accumulation meter 518 and the scene remains the same. The fourth reel 508 generates a J symbol 508*c* with a value of 20 208*d*. The J symbol was indicated in the game in the last symbol generation. The scene on the associated accumulation meter 520 remains the same and the value indicator displays a value of 40, 20 for the previously generated J symbol and 20 for the J symbol generated this spin. The fifth reel 510 generates an M symbol 510*c* with a value of 20 510*d*. The gaming device highlights the M region of the scene of the associated accumulation meter 522 and displays a 30 in the value indicator, 10 from the previous spin and 20 from the current spin. The final reel generates a Q symbol 512*c* with a value of 20 512*d*. The Q region is highlighted on the associated accumulation meter and the value indicator displays a value of 25.

The first, second, fifth and sixth reels each only have one region of each of their regions left to be highlighted or indicated. If at least one of these reels generates the symbol that has not been indicated or marked yet, the game is terminated and the player receives an award.

Figure 19D:
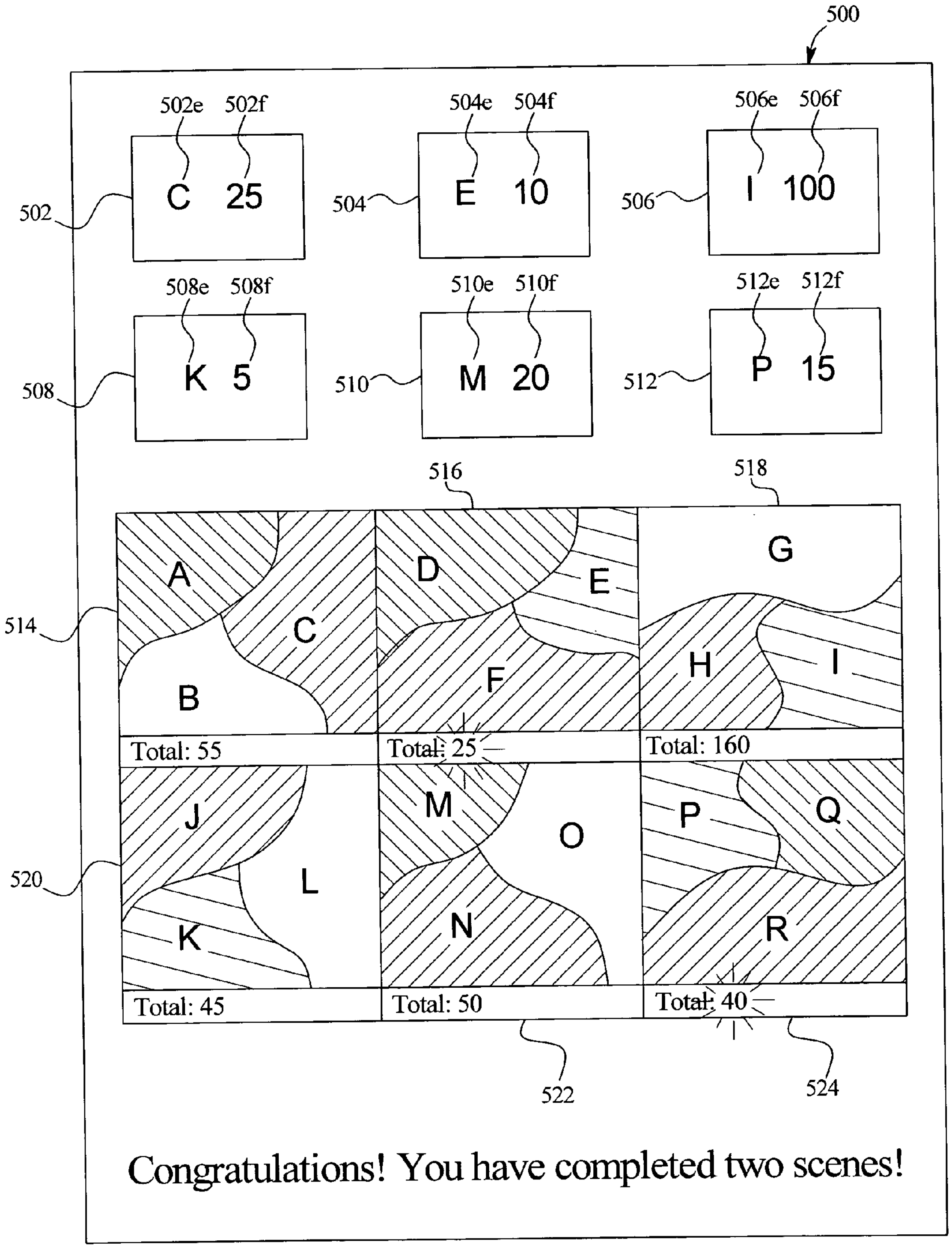

The reels spin again and new symbols are generated as illustrated in FIG. 19D. The first reel generates a C symbol 502*e*. The C symbol was generated in the first symbol generation of the game. The value of the C symbol, 25 502*f*, is added to the accumulated value displayed in the value indicator of the associated accumulation meter 514. The value indicator displays a value of 55. The second reel 504 generates the E symbol 504*e* with a value of 10 504*f*. The E symbol was the final symbol in the symbol group for the second reel to be generated, thereby ending the game. The third, fourth and fifth reels repeat or have repeated a symbol and each still have a symbol remaining to be indicated in their respective symbol groups. The final reel 512 indicates a P symbol 512*e* with a value of 15 512*f* which is the final symbol in the symbol group associated with sixth reel. The P region of the associated accumulation meter is highlighted. The value of 15 is added to the value indicator which displays a value of 40.

In one embodiment, the player receives an award based on the accumulated award values for the reel with all of the symbols marked off. As illustrated in 5D, the second reel 504 and the sixth reel 512 each have generated all of the symbols in the associated symbol set. That is, the second and sixth reel simultaneously indicated all of the symbols associated with the symbol generator. The gaming device has filled in the entire scene on the accumulation meter 516 corresponding to the second reel and the entire scene of the accumulation meter associated with the sixth reel 524. In one embodiment, the player would receive the award of 65 (i.e., 25+40) which is the sum of the total values of the generated symbols for the reels with all of the symbols generated. In this embodiment, the player may receive an award of 40, based on the higher of the two possible awards achieved.

The values associated with the symbols may be a numerical value that is positive, negative or zero. The value or award associated with the symbols may also be a functional game element, such as allowing the player to advance to another round, proceed to a bonus game, receive an extra spin or any other suitable function game value. In one embodiment, all of the symbol generators include the same number of symbols. In another embodiment, the symbol generators include one or more different symbols. In one embodiment, each same symbol, (i.e. all diamonds are the same symbol) in the game has the same value. In another embodiment, each same symbol has a different value in every set of symbols or for every symbol generator. In one embodiment, if the symbol has a high value, it has a low probability. In an alternative embodiment, each set of symbols for a symbol generator has a range of values and a range of probabilities.

In an alternative embodiment, the game includes filler or non-designated symbols. The non-designated symbols are not part of a symbol set and are not associated with a value. When a symbol generator indicates a non-designated symbol, that symbol does not count towards indicating the designated number of the symbols in a symbol set. The non-designated symbols may or may not be associated with a value or an award.

In another embodiment, the display device displays the number of symbols that have been indicated to mark them off. For example, if only one symbol on a reel with five symbols has been indicated, a display would display ⅕. In another embodiment, a display screen flashes words to indicate the symbol generator has the most symbols marked off.

In an alternative embodiment, the gaming device does not add the value of a repeated symbol on a symbol generator to the accumulated value associated with the symbol generator. For example, the value next to the diamond symbol and displayed in the value indicator would be 5, instead of 40. In this alternative embodiment, the value of the repeated symbol is not added to the total in the value indicator for that reel either.

In one embodiment, each of the symbol sets is associated with a designated number or a predetermined number of symbols. Once one of the symbol generators has indicated the designated number of symbols, that symbol generator resets. That is, the accumulated value for that symbol generator resets or becomes a value of zero. Additionally, in one embodiment, the accumulation meter resets and thus the value indicator resets. That is, the symbols, values or regions are no longer indicated on the accumulation meter and the value indicator displays a value of zero. In one embodiment, after one of the symbol generators and/or accumulation meters resets, the game continues. The symbol generator or accumulation meter that resets begins indicating the designated number of symbols over again. That is, the other symbol generators do not reset. In another embodiment, a reset symbol appearing on one of the symbol generators causes all of the symbol generators and/or accumulation meters to reset and the game continues.

In another embodiment, one, some or all of the symbol sets include a reset symbol. It should be appreciated that the reset symbol may be any suitable symbol. In this embodiment, when the gaming device generators one of the reset symbols, the associated accumulation meter resets. In this embodiment, only the accumulation meter associated with the symbol generator which indicated the reset symbol resets and the game continues. It should be appreciated that when a reset symbol is indicated, the reels and/or accumulation meters reset, even though less than the predetermined or designated number of symbols have been indicated in the associated symbol set.

In another embodiment, one, more or all of the symbol sets includes a terminating symbol. It should be appreciated that the terminating symbol may be any suitable symbol and may or may not be associated with a value. In one embodiment, when one of the symbol indicators indicates the terminating symbol, the game ends and the gaming device provides the player with the accumulated award for that symbol generator. It should be appreciated that in this embodiment, the game ends though the designated number of symbols have not been indicated in any of the symbol groups. In another embodiment, the terminating symbol causes that symbol generator to stop generating symbols. That is, that symbol generator and thus the accumulation of values for that symbol generator ends and the player cannot obtain the value for that symbol generator.

It should be appreciated that the award provided to the player may be determined in any suitable manner. In one embodiment of the present invention, the award provided to the player is based on the accumulated value indicated in the accumulation meter corresponding to the symbol generator with the designated number of its symbols generated. In one embodiment, more than one of the symbol sets may indicate the designated number of symbols at the same time. In this embodiment, this simultaneous generation of the designated symbols may result in an award which includes the accumulated values for all of the symbol generators associated with these symbol sets. In an alternative embodiment, the gaming device provides the player a set amount based on which symbol generator has all of the symbols in its associated symbol set marked first. In one example of this embodiment, the award is based on paytables. For example, each of the symbol generators is associated with a value or an award. In this example, the gaming device provides the player with the award associated with the symbol generator which has indicated the designated symbols or the designated number of symbols. In one embodiment, the gaming device includes designated ranges and payouts associated with the designated ranges. For example, the accumulated values may equal points which correct to game credits or monetary values (e.g. an accumulated value from 5 to 20 could equal a credit on the gaming machine). In another embodiment, the game includes a credit limit and when one of the accumulated values for at least one of the symbol generators reaches the credit limit, the game ends and the gaming device provides the player an award based on the credit limit. In this embodiment, the game ends even though the predetermined or designated number of symbols or symbols has not been generated.

The embodiments discussed above involve multiple rounds can involve any number of symbol generators, any number of symbols and any number of rounds. These embodiments may be implemented in a primary or secondary game. Furthermore, these embodiments can incorporate any type of theme for entertainment purposes.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming device operated under the control of a processor, said gaming device comprising:
- at least one input device; and
- at least one display device including a plurality of reels, wherein the processor is programmed to operate with the at least one input device and the at least one display device, for a play of a game, to:
- (a) for each of the plurality of reels:
  - (i) randomly generate and display one of a plurality of symbols of a symbol set associated with said reel, wherein at least one of the symbols in said symbol set is associated with a value,
  - (ii) determine if the generated symbol is part of a symbol subset associated with the reel, said symbol subset including a predetermined number of different symbols, wherein the predetermined number is greater than one,
  - (iii) if the generated symbol is part of the symbol subset associated with the reel, determine any value associated with the generated symbol,
  - (iv) add any determined value to an accumulated value associated with the symbol subset, wherein if one of the symbols of the symbol subset is subsequently generated by said symbol generator, any determined value associated with the subsequently generated symbol which is part of the symbol subset is again added to the accumulated value, and
  - (v) determine if a designated number of the symbols of the symbol subset associated with the reel have been generated and:
    - (a) if the designated number of the symbols of the symbol subset associated with the reel have not been generated, subsequently randomly generate and display an additional one of the plurality of symbols of the symbol set associated with said reel and repeat (ii) to (v), and
    - (b) if the designated number of the symbols of the symbol subset associated with the reel have been generated, determine an award associated with the reel based at least in part on the accumulated value associated with the symbol subset; and
- (b) after the designated number of the symbols of the symbol subset associated with at least one of the plurality of reels have been generated, provide a total award to a player based, at least in part, on the award associated with at least one of the symbol subsets for which the designated number of the symbols have been generated.

2. The gaming device of claim 1, wherein each reel is associated with an accumulation meter.

3. The gaming device of claim 2, wherein the processor is programmed to operate with the at least one display device to display the plurality of accumulation meters.

4. The gaming device of claim 1, wherein for each symbol set, each symbol is associated with a probability of being generated by its respective reel and at least two of the probabilities are different.

5. The gaming device of claim 4, wherein the processor is programmed to determine which symbol of the symbol set to generate for each reel based on the probabilities associated with each symbol in the symbol set.

6. The gaming device of claim 1, wherein each symbol set includes the same set of symbols.

7. The gaming device of claim 1, wherein each symbol set includes at least one different symbol.

8. The gaming device of claim 1, wherein at least two of the symbol sets include the same symbol, wherein the same symbol is associated with a different value for a plurality of the symbol sets.

9. The gaming device of claim 1, wherein the value associated with a particular symbol is the same for each symbol set.

10. The gaming device of claim 1, wherein the values associated with the symbols are numerical.

11. The gaming device of claim 1, wherein the processor is programmed to operate with the at least one display device to mark each generated symbol, wherein said marked symbols remain indicated for the game.

12. The gaming device of claim 1, wherein a plurality of the symbol subsets are associated with a different designated number of symbols.

13. A gaming device operated under the control of a processor, comprising:

at least one input device; and at least one display device including a plurality of reels, wherein the processor is programmed to operate with the at least one input device and the at least one display device, for a play of a game, to:

(a) for each reel:

(i) randomly generate a symbol from a plurality of symbols of a symbol set associated with the reel based on a plurality of probabilities associated with the symbols of the symbol set associated with that reel, wherein at least one of the symbols in said symbol set is associated with a value, (ii) determine if the generated symbol is part of a symbol subset associated with the reel, said symbol subset including a predetermined number of different symbols, wherein the predetermined number is greater than one, (iii) if the generated symbol is part of the symbol subset associated with the reel, determine any value associated with the generated symbol, (iv) add any determined value to an accumulated value associated with the symbol subset, wherein if one of the generated symbols is subsequently generated by said reel, any determined value associated with said subsequently generated symbol which is part of the symbol subset is again added to the accumulated value, and (v) determine if a designated number of the symbols of the symbol subset associated with the reel have been generated, wherein said designated number is greater than one and:

(a) if the designated number of the symbols of the symbol subset associated with the reel have not been generated, subsequently randomly generate and display an additional one of the plurality of symbols of the symbol set associated with said reel and repeat (ii) to (v), and (b) if the designated number of the symbols of the symbol subset associated with the reel have been generated, determine an award associated with the reel based at least in part on the accumulated value associated with the symbol subset; and (b) after the designated number of the symbols of the symbol subset associated with at least one of the plurality of reels have been generated, provide a total award to a player based, at least in part, on the award associated with at least one of the subsets of symbols for which the designated number symbols have been generated.

14. The gaming device of claim 13, wherein each of the symbol subsets are associated with a same designated number of symbols.

15. The gaming device of claim 13, wherein at least two of the symbol subsets are associated with a different designated number of symbols.

16. The gaming device of claim 13, wherein the processor is programmed to operate with the at least one display device to display a plurality of accumulation meters, wherein each of the accumulation meters corresponds to a different reel.

17. The gaming device of claim 16, wherein the processor is programmed to operate with the at least one display device to display the value associated with each indicated symbol at the corresponding accumulation meter.

18. The gaming device of claim 13, wherein the processor is programmed to operate with the at least one display device to mark each generated symbol, wherein said marked symbols remain indicated for the game.

19. The gaming device of claim 13, wherein at least two of the probabilities are different.

20. A gaming device operated under the control of a processor, said gaming device comprising:

at least one input device; and at least one display device including a plurality of mechanical reels, wherein the processor is programmed to operate with the at least one input device and the at least one display device, for a play of a game, to:

(a) for each of the plurality of reels:

(i) randomly generate and display one of a plurality of symbols of a symbol set associated with the reel based on a plurality of probabilities associated with the symbols in the symbol set associated with that reel, wherein at least one of the symbols in said symbol set is associated with a value, (ii) determine if the generated symbol is part of a symbol subset associated with the reel, said symbol subset including a predetermined number of different symbols, said predetermined number being greater than one, (iii) if the generated symbol is part of the symbol subset associated with said reel, determine any value associated with the generated symbol, (iv) add any determined value to an accumulated value associated with the symbol subset for said reel, wherein if one of the symbols in the symbol set associated with the reel is subsequently generated by said reel, any determined value associated with the subsequently generated symbol which is part of the symbol subset is again added to the accumulated value, and (v) determine if a designated number of the symbols of the symbol subset associated with the reel have been generated, wherein said designated number is greater than one and:

(a) if the designated number of the symbols of the symbol subset associated with the reel have not been generated, subsequently randomly generate and display an additional one of the plurality of symbols of the symbol set associated with said reel and repeat (ii) to (v), and (b) if the designated number of the symbols of the symbol subset associated with the reel have been generated, determine an award associated with the reel based at least in part on the accumulated value associated with the reel; and (b) after the designated number of the symbols of the symbol subset associated with at least one of the plurality of reels have been generated, provide a total award to a player based, at least in part, on the award associated with the at least one of the symbol subsets for which the designated number of symbols has been generated.

21. The gaming device of claim 20, wherein the award provided to the player is the sum of the values of the generated symbols in the symbol set for which the designated number of symbols were generated.

22. The gaming device of claim 20, wherein the processor is programmed to operate with the at least one display device to display the value of each of the generated symbols next to the symbol.

23. The gaming device of claim 20, wherein each reel is associated with an accumulation meter.

24. The gaming device of claim 23, wherein the processor is programmed to operate with the at least one display device to display each accumulation meter and display the accumulated value for each symbol subset of each reel at its respective accumulation meter.

25. The gaming device of claim 24, wherein the processor is programmed to operate with the at least one display device to display the symbols in the symbol subset associated with the each reel at each respective accumulation meter.

26. The gaming device of claim 25, wherein for each of the plurality of reels, each of the symbols in the symbol subset associated with the respective reel are associated with a related area of the accumulation meter associated with the reel, wherein the related area of the corresponding accumulation meter is highlighted or marked upon generation of said symbols by the reel.

27. The gaming device of claim 20, wherein the processor is programmed to operate with the at least one display device to mark each generated symbol, wherein said marked symbols remain indicated for the game.

28. The gaming device of claim 20, wherein said reels are independent.

29. The gaming device of claim 20, wherein each of a plurality of the symbol subsets are associated with a designated number of symbols.

30. A gaming device operated under the control of a processor, said gaming device comprising:

at least one input device; and at least one display device including a plurality of reels, the processor programmed to operate with the at least one input device and the at least one display device, for a play of a game, to:

(a) for each of the plurality of reels:

(i) randomly generate and display one of the symbols of a plurality of symbols of a symbol set associated with that reel, at least one of the symbols in said symbol set associated with a value, (ii) determine if the generated symbol is part of a symbol subset associated with said reel, said symbol subset including a predetermined number of different symbols, said predetermined number being greater than one, (iii) if the generated symbol is part of the symbol subset associated with said reel, determine any value associated with the generated symbol, (iv) add any determined value to an accumulated value associated with the symbol subset for said reel, and (v) determine if a designated number of different symbols of the symbol subset associated with the reel are generated, wherein said designated number is greater than one and (a) if the designated number of the symbols of the symbol subset associated with the reel have not been generated, subsequently randomly generate and display an additional one of the plurality of symbols of the symbol set associated with said reel and repeat (ii) to (v), and (b) if the designated number of the symbols of the symbol subset associated with the reel have been generated, determine an award associated with the reel based at least in part on the accumulated value associated with the symbol subset;

(b) after the designated number of the symbols of the symbol subset associated with at least one of the plurality of reels have been generated, provide a total award to a player which is based, at least in part, on the award associated with at least one of the symbol subsets for which the designated number symbols have been generated; and (c) when the designated number of symbols are generated for one of the symbol sets, reset the accumulated values of each of the symbol sets.

31. The gaming device of claim 30, wherein steps (ii) to (vii) are repeated at least twice for at least one of the plurality of reels.

32. The gaming device of claim 30, wherein the display device includes a plurality of accumulation meters, wherein each of the accumulation meters corresponds to a different reel.

33. The gaming device of claim 32, wherein the processor is programmed to operate with the at least one display device to display the value of each generated symbol at the corresponding accumulation meter.

34. The gaming device of claim 33, wherein the processor is programmed to operate with the at least one display device to when each of the symbols are generated for one of the symbol sets, reset the accumulation meter corresponding to the reel associated with that symbol set.

35. The gaming device of claim 30, wherein the processor is programmed to operate with the at least one display device to mark each generated symbol, wherein said marked symbols remain indicated for the game.

36. The gaming device of claim 30, wherein one of the designated numbers of symbols includes all of the symbols in at least one of the sets.

37. The gaming device of claim 30, wherein each of a plurality of the symbol subsets are associated with a different designated number of symbols.

38. A method of operating a gaming device including at least one input device, at least one display device including a plurality of reels, and at least one processor, said method comprising:

(a) providing a plurality of symbol sets, wherein each of the symbol sets includes a plurality of symbols and at least one of the symbols in each of the symbol sets is associated with a value, (b) separately associating each of the symbol sets with a different one of a plurality of reels;

(c) for each reel:

(i) the at least one processor causing the at least one display device to randomly generate and display one of the symbols of the symbol set associated with the reel, (ii) the at least one processor determining if the generated symbol is part of a symbol subset associated with the reel, said symbol subset including a predetermined number of different symbols, said predetermined number being greater than one, (iii) if the generated symbol is part of the symbol subset associated with the reel, the at least one processor determining any value associated with the generated symbol, (iv) the at least one processor adding any determined value to an accumulated value associated with said symbol subset for said reel, wherein if one of the symbols of the symbol subset is subsequently generated by the reel, any determined value associated with the subsequently generated symbol which is part of the symbol set is again added to the accumulated value for that symbol subset, and (v) the at least one processor determining if a predetermined number of symbols have been generated for the symbol subset and:

(a) if the designated number of the symbols of the symbol subset associated with the reel have not been generated, the at least one processor subsequently causing the at least one display device to randomly generate and display an additional one of the plurality of symbols of the symbol set associated with said reel and repeating (ii) to (v), and (b) if the designated number of the symbols of the symbol subset associated with the reel have been generated, the at least one processor determining an award associated with the reel based at least in part on the accumulated value associated with the symbol subset; and (d) after the designated number of the symbols of the symbol subset associated with at least one of the plurality of reels have been generated, providing a total award to a player based, at least in part, on the award associated with at least one of the symbol subsets for which the predetermined number of the symbols have been generated.

39. The method of claim 38, which includes displaying a plurality of accumulation meters, wherein each of the accumulation meters corresponds to a different reel.

40. The method of claim 39, which includes displaying any of the values associated with the indicated symbols on the corresponding accumulation meter.

41. The method of claim 38, which includes marking each generated symbol, wherein said marked symbols remain indicated.

42. The method of claim 38, which includes associating each symbol with a probability of being generated on said reels, wherein at least two of the probabilities are different.

43. The method of claim 42, which includes determining which symbol to indicate for each reel based on the probabilities associated with each symbol in the symbol set associated with each reel.

44. The method of claim 38, which includes at least one of the symbol sets including at least one terminating symbol.

45. The method of claim 38, which includes at least one of the symbol sets including at least one reset symbol.

46. A method of operating a gaming device including at least one input device, at least one display device including a plurality of reels, and at least one processor, said method comprising:

(a) for each of the plurality of reels:

(i) the at least one processor randomly determining a symbol of a plurality of symbols of a symbol set associated with the reel to generate based on a plurality of probabilities associated with the symbols in the symbol set, wherein at least one of the symbols in the symbol set is associated with a value, (ii) the at least one display device displaying the determined symbol, (iii) the at least one processor determining if the generated symbol is part of a symbol subset associated with the reel, said symbol subset including a predetermined number of different symbols, said predetermined number being greater than one, (iv) if the generated symbol is part of the symbol subset associated with the reel, the at least one processor adding any determined value to an accumulated value associated with said symbol subset, wherein if the generated symbol is subsequently generated by said reel, any determined value associated with the subsequently generated symbol which is part of the symbol subset is again added to the accumulated value for that symbol subset, and (v) the at least one processor determining if a designated number of the symbols of the symbol subset associated with the reel have been generated, wherein said designated number of symbols is greater than one and:

(a) if the designated number of the symbols of the symbol subset associated with the reel have not been generated, the at least one processor subsequently randomly generating and the at least one display device displaying an additional one of the plurality of symbols of the symbol set associated with said reel and repeating (iii) to (v), and (b) if the designated number of the symbols of the symbol subset associated with the reel have been generated, the at least one processor determining an award associated with the symbol indicator based at least in part on the accumulated value associated with the symbol subset; and (b) after the designated number of the symbols of the symbol subset associated with at least one of the plurality of symbol indicators have been generated, providing a total award to a player based, at least in part, on the award associated with at least one of the symbol subsets for which the designated number of symbols have been generated.

47. The method of claim 46, which includes displaying a plurality of accumulation meters, wherein each of the accumulation meters corresponds to a different symbol indicator.

48. The method of claim 47, which includes displaying the value of each generated symbol on the corresponding accumulation meter.

49. The method of claim 46, which includes marking each generated symbol, wherein said marked symbols remain indicated for the game.

50. A method of operating a gaming device including at least one input device, at least one display device including a plurality of reels, and at least one processor, said method comprising:

(a) the at least one display device displaying the plurality of reels in a game;

(b) providing a plurality of symbols sets associated with each of said reels which each include a plurality of symbols, wherein at least one of the symbols in each set is associated with a value and a probability, wherein at least two of the probabilities are different;

(c) for each of the plurality of reels:

(i) the at least one processor randomly determining which symbol of a plurality of symbols of the symbol set associated with the reel to generate based on the probabilities associated with the symbol set associated with that reel, (ii) the at least one display device displaying the determined symbol, (iii) the at least one processor determining if the generated symbol is part of a symbol subset associated with the reel, said symbol subset including a predetermined number of different symbols, said predetermined number being greater than one, (iv) if the generated symbol is part of the symbol subset associated with the reel, the at least one processor determining any value associated with the generated symbol, and (v) the at least one processor adding any determined value to an accumulated value associated with the symbol subset, wherein if one of the symbols of the symbol subset is subsequently generated by that reel, any determined value associated with the subsequently generated symbol which is part of the symbol subset is again added to the accumulated value for that symbol subset, and (vi) the at least one processor determining if a designated number of the symbols of at least one of the symbol subsets have been generated, wherein said designated number is greater than one and:

(a) if the designated number of the symbols of the symbol subset associated with the reel have not been generated, the at least one processor subsequently randomly generating and causing the at least one display device to display an additional one of the plurality of symbols of the symbol set associated with said reel and repeating (iii) to (vi), and (b) if the designated number of the symbols of the symbol subset associated with the reel have been generated, the at least one processor determining an award associated with the symbol generator based at least in part on the accumulated value associated with the symbol subset; and (d) after the designated number of the symbols of the symbol subset associated with at least one of the plurality of reels have been generated, providing a total award to a player based, at least in part, on the values associated with the generated symbols of at least one of the symbol subsets for which the designated number of symbols have been generated.

51. The method of claim 50, which includes displaying any values associated with the generated symbols next to each symbol.

52. The method of claim 50, which includes displaying a plurality of accumulation meters, wherein each of said accumulation meters is associated with one of said reels.

53. The method of claim 52, which includes displaying the accumulated value for each symbol subset in each accumulation meter.

54. The method of claim 53, which includes displaying the symbols associated with the corresponding reel on each of the accumulation meters.

55. The method of claim 52, which includes associating each of the symbols with a related area on the accumulation meters, wherein the related area of the corresponding accumulation meter is highlighted or marked upon generation of said symbols.

56. The method of claim 50, which includes marking each generated symbol, wherein said marked symbols remain indicated for the game.

57. A method of operating a gaming device including at least one input device, at least one display device including a plurality of reels, and at least one processor, said method comprising;

(a) providing a plurality of symbol sets, wherein each symbol set includes a plurality of symbols and at least one of the symbols in each symbol set is associated with a value;

(b) the at least one display device displaying the plurality of reels, wherein each of the reels is separately associated with a different one of the symbol sets;

(c) for each of the plurality of reels:

(i) the at least one processor randomly generating and causing the at least one display device to display one of the symbols of the symbol set associated with said reel, (ii) the at least one processor determining if the generated symbol is part of a symbol subset associated with said reel, said symbol subset including a predetermined number of different symbols, said predetermined number being greater than one, (iii) if the generated symbol is part of a symbol subset associated with said reel, the at one processor determining any value associated with the generated symbol, (iv) the at least one processor adding any determined value to an accumulated value associated with said symbol subset, and (v) the at least one processor determining if a designated number of different symbols are generated for at least one of the symbol subsets, wherein said designated number is greater than one and:

(a) if the designated number of the symbols of the symbol subset associated with the reel have not been generated, the at least one processor subsequently randomly generating and causing the at least one display device to display an additional one of the plurality of symbols of the symbol set associated with said reel and repeating (ii) to (v), and (b) if the designated number of the symbols of the symbol subset associated with the reel have been generated, the at least one processor determining an award associated with the reel based at least in part on the accumulated value associated with the symbol subset;

(d) after the designated number of the symbols of the symbol subset associated with at least one of the plurality of reels have been generated, providing a total award to the player, based at least in part, on the values associated with the symbols of at least one of the symbol subsets for which the designated number of symbols are generated; and (e) resetting the accumulated values and the designated numbers of generated symbols of each respective symbol subset when the designated number of symbols are generated for one of the symbol subsets.

58. The method of claim 57, which includes displaying a plurality of accumulation meters, wherein each of the accumulation meters corresponds to a different symbol generator.

59. The method of claim 58, which includes displaying the values associated of any generated symbols on the corresponding accumulation meter.

60. The method of claim 57, which includes repeating steps (ii) to (vii) at least once for at least one of the plurality of symbol reels.

61. The method of claim 57, which includes one of the designated numbers of symbols including all of the symbols in at least one of the symbol subsets.

62. The method of claim 57, which includes associating the symbol subsets with a plurality of different designated numbers of symbols.

* * * * *

UNITED STATES PATENT AND TRADEMARK OFFICE

CERTIFICATE OF CORRECTION

PATENT NO. : 7,794,320 B2
APPLICATION NO. : 10/941485
DATED : September 14, 2010
INVENTOR(S) : Baerlocher et al.

It is certified that error appears in the above-identified patent and that said Letters Patent is hereby corrected as shown below:

IN THE CLAIMS:

In Claim 30, Column 32, Line 21, after “and” insert --:--.

In Claim 31, Column 32, Line 45, replace “(vii)” with --(v)--.

In Claim 60, Column 38, Line 5, replace “(vii)” with --(v)--.

Signed and Sealed this
Twenty-sixth Day of July, 2011

David J. Kappos

David J. Kappos
*Director of the United States Patent and Trademark Office*